United States Patent
Kim

(10) Patent No.: US 9,426,118 B2
(45) Date of Patent: *Aug. 23, 2016

(54) REMOTE GRANT OF NETWORK ACCESS

(71) Applicant: Belkin International Inc., Playa Vista, CA (US)

(72) Inventor: Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,443

(22) Filed: Oct. 28, 2014

(65) Prior Publication Data

US 2016/0119284 A1   Apr. 28, 2016

(51) Int. Cl.
    *H04L 29/06*    (2006.01)
    *H04W 12/08*    (2009.01)
    *H04L 29/08*    (2006.01)
    *H04L 29/12*    (2006.01)

(52) U.S. Cl.
    CPC ............ *H04L 63/02* (2013.01); *H04L 61/6022* (2013.01); *H04L 63/0876* (2013.01); *H04L 67/141* (2013.01); *H04W 12/08* (2013.01)

(58) Field of Classification Search
    USPC .......................................................... 726/12
    See application file for complete search history.

(56) References Cited

U.S. PATENT DOCUMENTS

| 2006/0036847 A1* | 2/2006 | Bush .................. H04L 29/12783 713/153 |
| 2009/0296601 A1* | 12/2009 | Citrano, III ........... H04L 63/062 370/254 |
| 2010/0091669 A1* | 4/2010 | Liu .......................... H04L 45/20 370/252 |
| 2014/0143397 A1* | 5/2014 | Gutt ........................ H04L 41/00 709/223 |

\* cited by examiner

*Primary Examiner* — Jeffrey Pwu
*Assistant Examiner* — Samuel Ambaye
(74) *Attorney, Agent, or Firm* — Kilpatrick Townsend & Stockton LLP

(57) ABSTRACT

Systems and techniques for granting of network access to a new network device are described. Specifically, various techniques and systems are provided for connecting a new network device to a network and limiting access of the network device while authenticating the new network device. Exemplary embodiments of the present invention include a computer-implemented method. The method comprises receiving, at a gateway on a network, a communication including a request for a new network device to join the network; establishing a connection between the new network device and the gateway; generating a firewall configured to prevent the new network device from communicating with an additional device on the network; transmitting a query, wherein the query includes a request to determine whether the new network device is associated with the network; receiving a communication including a response to the query indicating that the new network device is associated with the network; removing the firewall so as to allow the new network device to communicate with the additional network device.

24 Claims, 20 Drawing Sheets

REMOTE GRANT OF NETWORK ACCESS

FIELD

The present disclosure relates to granting of network access to a new network device. Specifically, various techniques and systems are provided for connecting a new network device to a network and limiting access of the network device while authenticating the new network device.

BRIEF SUMMARY

Exemplary embodiments of the present invention include a computer-implemented method. The method comprises receiving, at a gateway on a network, a communication including a request for a new network device to join the network; establishing a connection between the new network device and the gateway; generating a firewall configured to prevent the new network device from communicating with an additional device on the network; transmitting a query, wherein the query includes a request to determine whether the new network device is associated with the network; receiving a communication including a response to the query indicating that the new network device is associated with the network; removing the firewall so as to allow the new network device to communicate with the additional network device.

Alternative exemplary embodiments of the present invention include a computing device. The computing device comprises one or more processors; and a memory having instructions stored thereon, which when executed by the one or more processors, cause the computing device to perform operations. The operations include receiving, at a gateway on a network, a communication including a request for a new network device to join the network; establishing a connection between the new network device and the gateway; generating a firewall configured to prevent the new network device from communicating with an additional device on the network; transmitting a query, wherein the query includes a request to determine whether the new network device is associated with the network; receiving a communication including a response to the query indicating that the new network device is associated with the network; and removing the firewall so as to allow the new network device to communicate with the additional network device.

Alternative exemplary embodiments of the present invention include a non-transitory computer-readable storage medium having instructions stored thereon. When executed by a computing device, the instructions cause the computing device to receive, at a gateway on a network, a communication including a request for a new network device to join the network; establish a connection between the new network device and the gateway; generate a firewall configured to prevent the new network device from communicating with an additional device on the network; transmit a query, wherein the query includes a request to determine whether the new network device is associated with the network; receive a communication including a response to the query indicating that the new network device is associated with the network; and remove the firewall so as to allow the new network device to communicate with the additional network device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
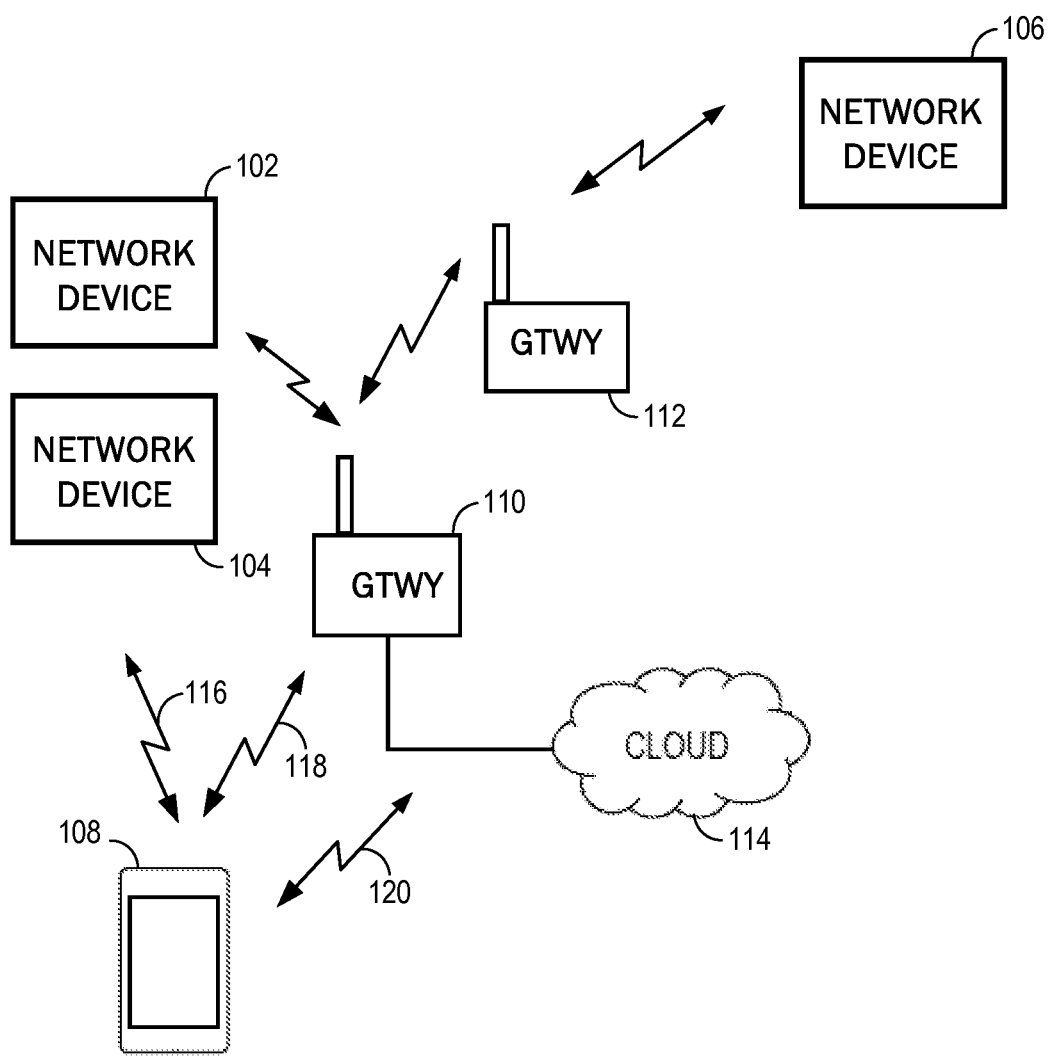
FIG. 1 illustrates an example of a wireless network environment, according to embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, the network devices 102, 104, 106 may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices such as a home automation network device may be used in other environments, such as a business, a school, an establishment, a park, or any place that can support the local area network 100 to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, cellular, long-term evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
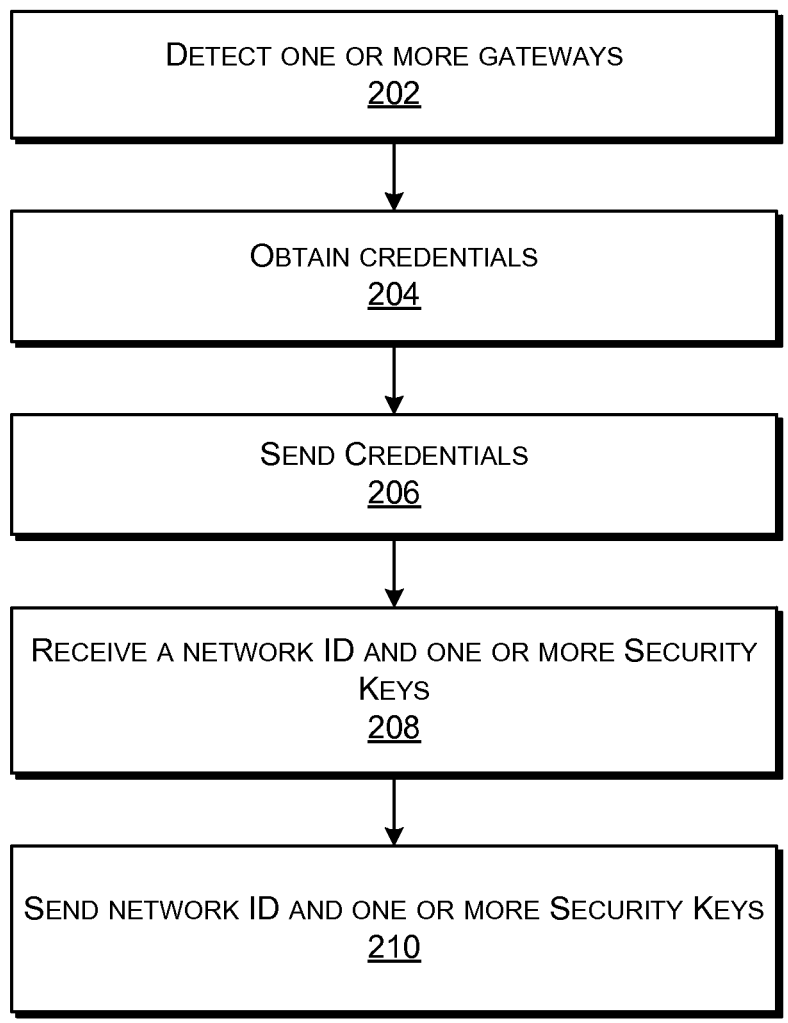
FIG. 2 is a flowchart illustrating an embodiment of a process for registering one or more network devices, according to embodiments of the present invention.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device.

The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the network device to push its change in in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
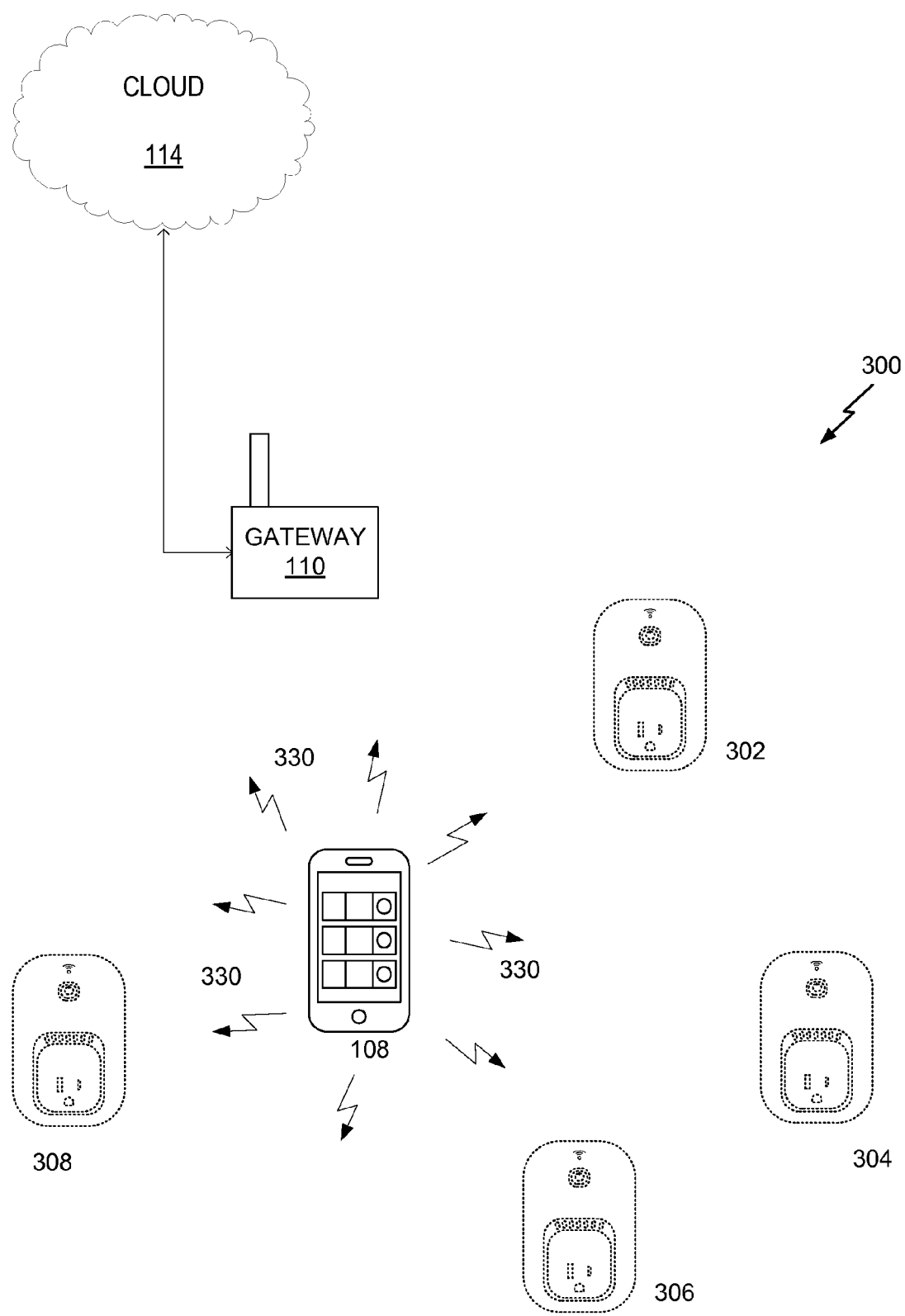
FIG. 3 illustrates an example of a network environment, according to embodiments of the present invention.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered the an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g. ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
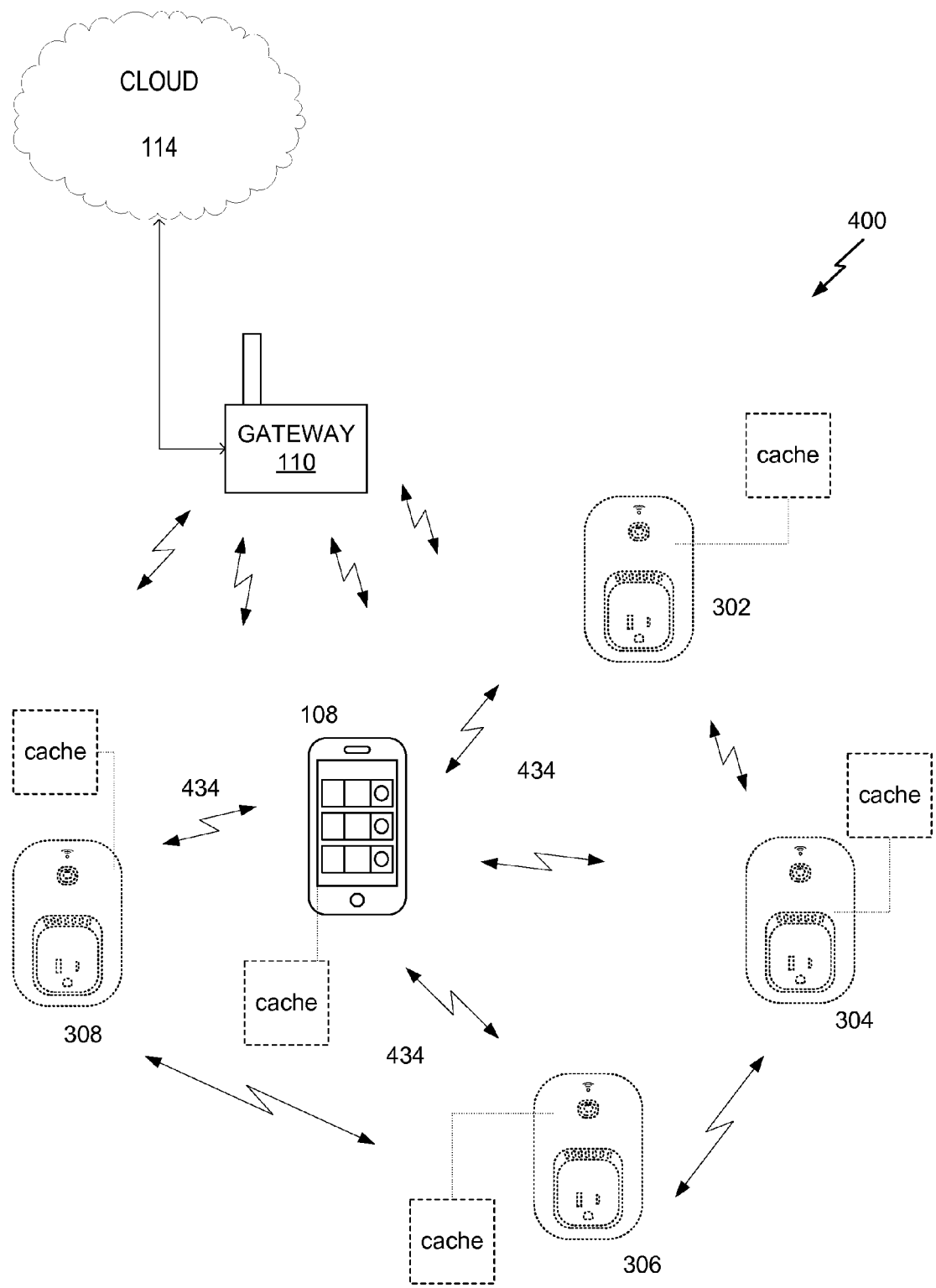
FIG. 4 illustrates an example of a network environment, according to embodiments of the present invention.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network 400 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off)

. However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
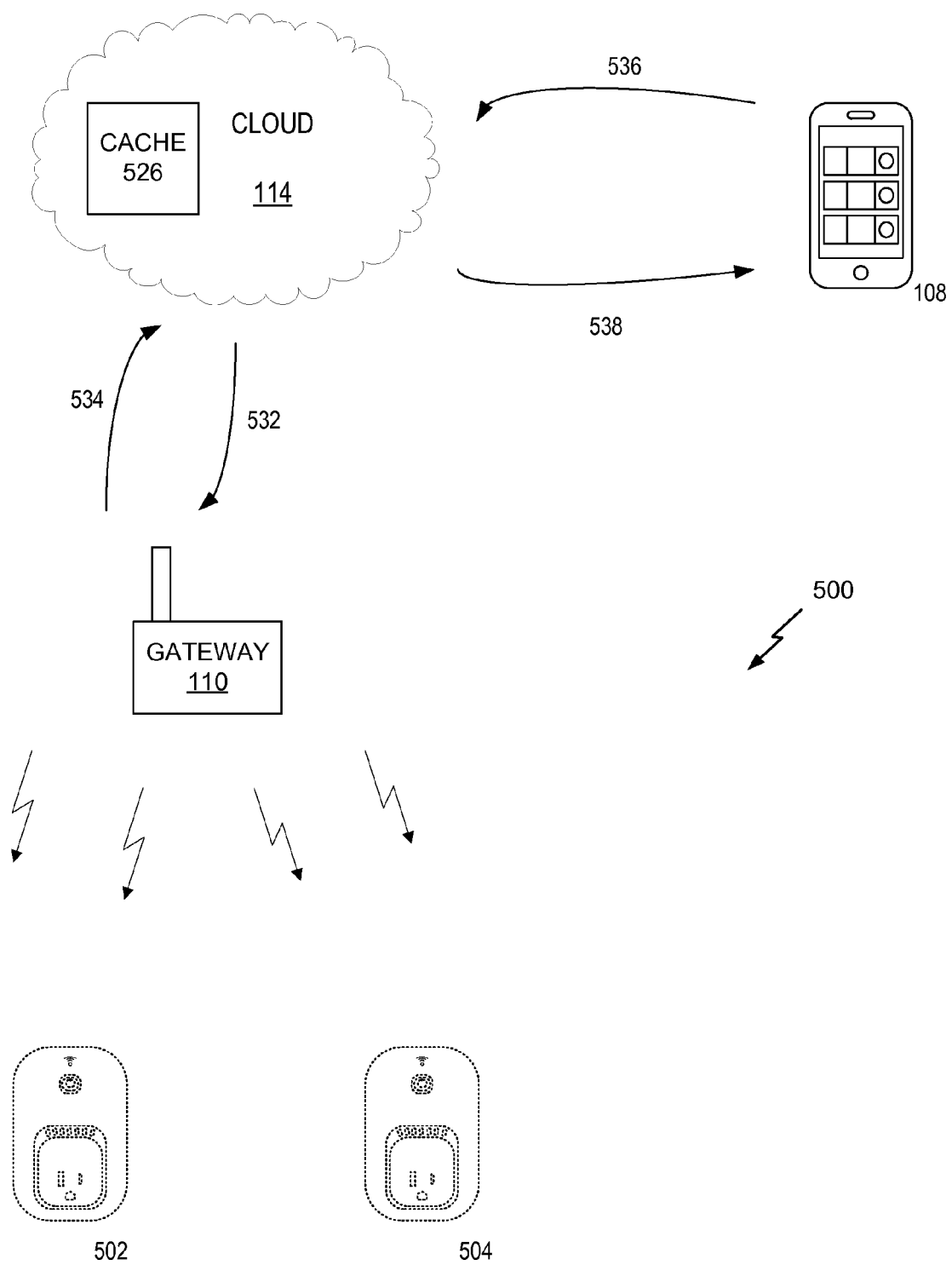
FIG. 5 illustrates an example of a network environment, according to embodiments of the present invention.

FIG. 5 illustrates an access device 108 that is located remotely from network 500 (e.g. local area network), according to embodiments of the present invention. Local area network 500 includes gateway 104 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 104 is connected to cloud network 120, and allows network devices 502 and 504 to connect to cloud 120, the internet, or other external networks via gateway 104. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 120 and to network 500 via cloud network 120. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 104. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 104. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Systems and techniques for granting of network access to a new network device are described. Specifically, various techniques and systems are provided for connecting a new network device to a network and limiting access of the network device while authenticating the new network device. For example, a new network device may connect with a network that allows the new network device to communicate with only a certain subset of the devices on the network (e.g. just the gateway of the network). The network may authorize (and/or authenticate) the new network device to join the network, for example by communicating with an access device controlled by the owner of the network and/or new network device. Authorizing the new network device to join the network may allow the new network device to communicate with the other network devices on the network.

Figure 6:
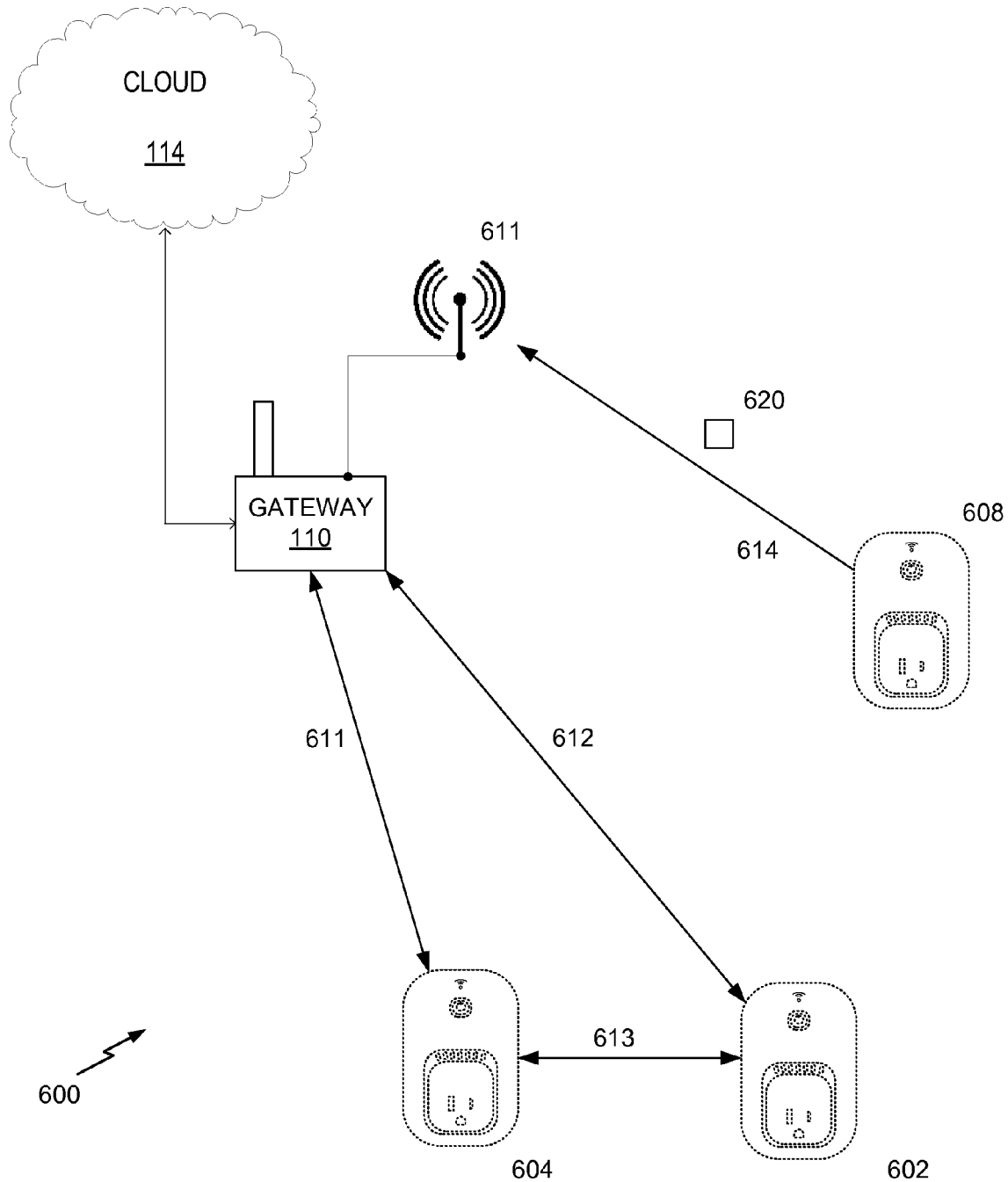
FIG. 6 illustrates an example of a local area network including a gateway and two network devices, according to embodiments of the present invention.

FIG. 6 illustrates an example of a local area network 600 including a gateway and two network devices, according to embodiments of the present invention. The local area network 600 may include a gateway 110, a network device 602, and a network device 604. Since gateway 110, network device 602, and network device 604 are each within local area network 600, gateway 110, network device 602, and network device 604 may communicate directly with each other. For example, network device 602 may communicate with network device 604 directly via communication path 613, or may communicate with network device 604 via gateway 110 (via communication paths 612 and 611). Similarly, network device 604 may communicate with network device 602 directly via communication path 613, or may communicate with network device 602 via gateway 110 (via communication paths 611 and 612).

Gateway 110 includes or is connected to a guest entry (access) point 611. A setup access point, such as for example a wireless access point, is a device that allows wireless devices to connect to a network using WiFi or other standards. A guest entry/access point, such as guest entry point 611, may be an example of a setup access point, but may be used by gateway 110 to control which and when guest devices may connect to the network 600. For example, guest entry point 611 may be set up such that a guest device (aka a "new network device") may connect to the network 600 via guest entry point 611, but may not connect to or communicate with any of the other devices on the network 600, such as network devices 602 and 604, until the new network device is authenticated by the gateway and/or network and/or by a user controlling the gateway and/or network.

Network device 608, which has not joined local area network 600, may attempt to join network 600. In other words, new network device 608 may desire to communicate with other network devices on the network, such as network devices 604 and/or 608. New network device 608 may transmit/send a query, including a request to join network 600, to gateway 110 via communication path 614. More specifically, network device 608 may, upon being powered up or turned on, may search for and find guest entry/access point 611 at or connected to gateway 110. Network device 608 may then attempt to connect to guest entry point 611. Instead of or in addition, new network device 608 may send a communication 620, including information or data, to guest entry point 611. The information may include information related to network device 608 and/or may include a request to connect to gateway 110 and network 600.

Figure 7:
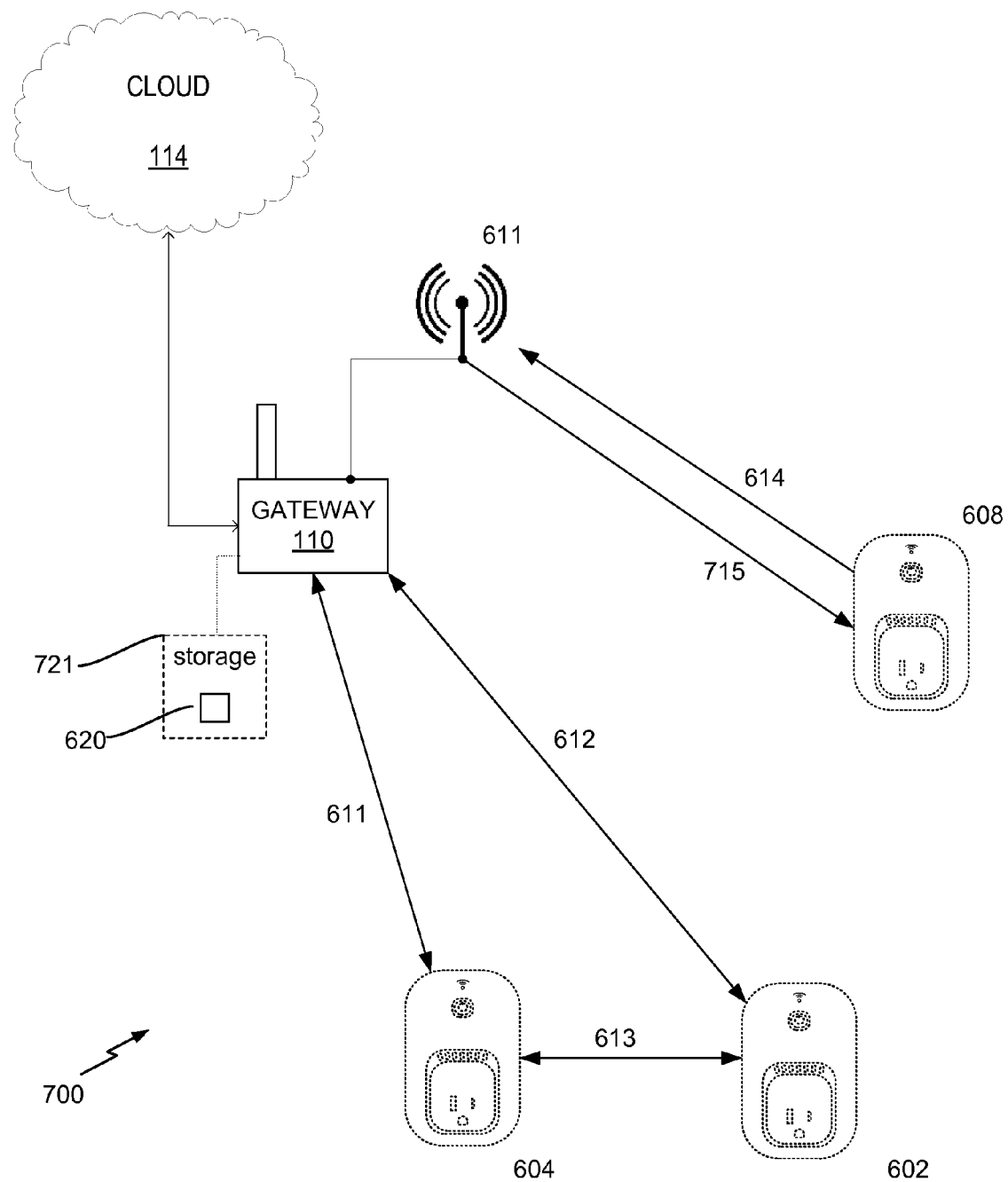
FIG. 7 illustrates an example of a local area network including a gateway and two network devices, according to embodiments of the present invention.

FIG. 7 illustrates an example of a local area network 700 including a gateway and two network devices, according to embodiments of the present invention. The local area network 700 may include a gateway 110, a network device 602, and a network device 604, similar to network 600 in FIG. 6. Gateway 110 includes or is connected to a guest entry (access) point 611. As noted with respect to FIG. 6, new network device 608 may transmit/send a query, including a request to join network 700, to gateway 110 via communication path 614. After gateway 110 (or guest entry point 611) has received a communication from new network device 608, gateway 110 may establish a connection with network device 608. For example, gateway 110 may establish a connection between network device 608 and guest entry point 611. Such a connection may be established by gateway 110 sending a communication back to 608 via communication path 715. The communication may include network credentials so as to allow network device 608 to connect to network 700. For example, gateway 110 (and/or access point 611) may send the network SSID and password (and/or other credentials) to new network device 608. Alternatively, the SSID may be an open SSID such that the new network device (or any other guest/new device) may connect to the guest entry point 611 without a password. Such an open network SSID would allow the user/owner of the network to allow a third party to connect to the network (e.g. to the gateway 110) without the user giving the network credentials (e.g. SSID and/or password) to the third party. As discussed further herein, the user may allow the third party to connect to the network/gateway without allowing the third party to communicate with or otherwise connect to the rest of the network (e.g. allowing it to connect to a guest network/entry point). In such a scenario, the network credentials sent to new network device 608, which may include network SSID and password, may include network credentials associated with the guest entry point, or a portion of the network that does not allow the new network device to connect with the established or existing devices on the network. The communication back to device 608 via path 715 may also include an acknowledgement that gateway 110 (and/or access point 611) received the request from new network device 608 to join the network.

For example, as noted, gateway 110 may transmit a communication to new network device 608 including network credentials (e.g. SSID and password) so as to allow new network device 608 to connect to (at least a portion of) the network, including gateway 110. However, new network device 608 may, in some embodiments of the present invention, connect to gateway 110 without gateway 110 transmitting such credentials to new network device 608. For example, new network device 608 may utilize well known (e.g. publically published) credentials, such as a well known SSID and password (or a corresponding mechanism for other types of wireless networks if such other wireless networks are used in embodiments of the present invention), to connect to gateway 110. The connection established between gateway 110 and new network device 608 may be a secure, even if the new network device uses published credentials to connect to gateway 110, or an unsecure connection. For example, the channel on which the new network device 608 and gateway 110 communicate may be encrypted and secure so as to protect any communications (e.g. including any network credentials, identification information, or other important data sent) between the new network device 608 and gateway 110.

Guest entry point 611 may be configured so that network device 608 is connected to guest entry point 611 (and/or to gateway 110), but so that network device 608 may not communicate with any other part of network 700 (alternatively, guest entry point 611 may be configured so that network device 608 is connected to guest entry point 611 (and/or to gateway 110), but so that network device 608 may only communicate with a portion of network 700). In other words, guest access point 611 may act as a triage area or holding cell for network device 608 (or, in other words, for the request from network device 608 to connect to and communicate with network devices in network 700). Therefore, even though network device 608 may be connected to network 700 via gateway 110 (or guest access point 611), gateway 110 may not rout/transmit the communication 620 to network devices on the network, such as network device 602 or 604.

Since network device 608 may not be able to communicate with any part of network 700 other than gateway 110 and/or access point 611, communication 620, including any information or data communicated to access point 611 with the request from device 608 to join network 700, may be stored in storage 721 within gateway 110. The communication 620 may be stored until new network device 608 has been fully connected to network 700. Alternatively, communication 620 may be later transmitted to other network devices on the network, such as network devices 602 and/or 604, after new network device 608 has been authenticated and may communicate with the other network devices on network 700.

Figure 8:
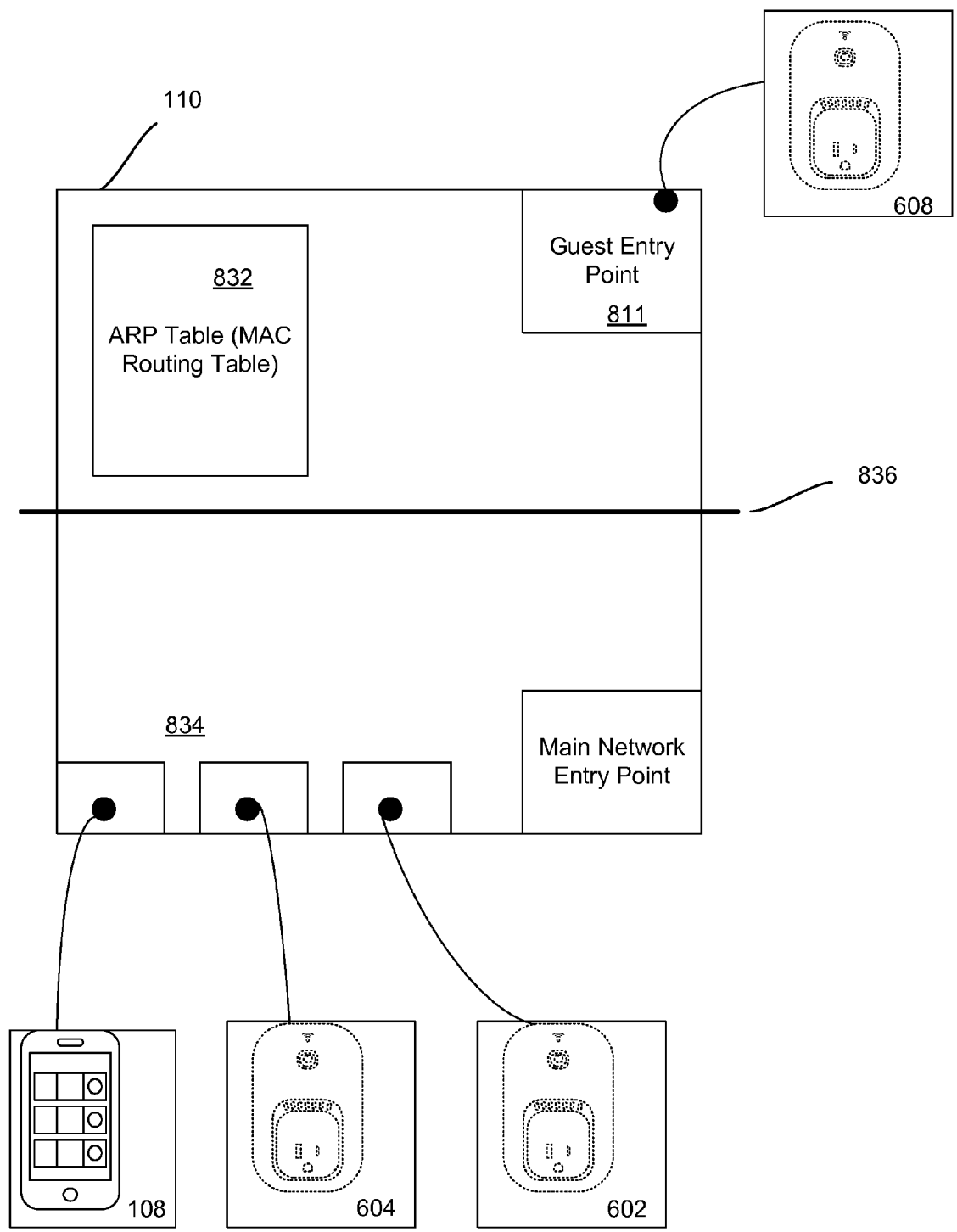
FIG. 8 illustrates a block diagram of a gateway, according to embodiments of the present invention.

FIG. 8 illustrates a block diagram of gateway 110, according to embodiments of the present invention. Gateway 110 includes a guest entry point 811 including a port for new network device 608 to connect to. However, unlike guest entry point 611 as shown in FIGS. 6 and 7, guest entry point 811 is located within gateway 110. Gateway 110 also includes wireless router ports 834 that allow network devices within the local area network that gateway 110 is a part of, such as network 700, to connect to gateway 110. For example, as shown in FIG. 8, access device 108, network device 602, and network device 604 are connected to gateway 110 via wireless router ports 834.

Gateway 110 may also include a firewall 836. Firewall 836 may include a physical separation between guest entry point 811 and the network devices on the network, or firewall 836 may be a virtual firewall so as to otherwise prevent a device, such as device 608, that is connected to guest entry point 811 to communicate with other devices on the network, such as network devices 602 and/or 604. Gateway 110 may also include an Address Resolution Progotol (ARP) Table 832 (which may also be called, for example, a MAC Address Routing Table). ARP table 832 may include MAC addresses for each network device on the network that is authorized to be on the network. For example, since router 110 may rout communications, information or data between network devices and/or between a network device and a device external to the network, the router may confirm with the ARP table that one or more of the devices involved in the transfer/communication are connected to the network and/or are authorized to be on the network.

As noted, guest entry point 611 or 811 may be configured so that network device 608 is connected to guest entry point 611/811 (and/or to gateway 110), but so that network device 608 may not communicate with any other part of the network (or a portion of the network). Gateway 110 may facilitate such a configuration through using firewall 836. Furthermore, the firewall may be virtual. For example, gateway 110 and/or guest entry point 811 may prevent new network device 608 from communicating with network devices on the network by removing the MAC address for new network device 608 into ARP table 832. Alternatively, gateway 110 (and/or access point 811) may refrain from putting the MAC address for network device 608 on ARP table 832 at all. For example, although new network device 608 may be allowed to connect with entry point 811 (and/or gateway 110), new network device 608 may not be allowed to communicate with network devices 602 and 604 because upon gateway 110 checking ARP table 832 for the MAC address of new network device 608 in ARP table 832, the MAC address may not be found. If and when new network device 608 has been authenticated and is allowed to join the network and communicate with network devices 602 and 604, the MAC address for network device 608 may be added to ARP table 832 so that gateway 110 will identify device 608 as a device having joined and/or been authenticated to join the network.

Other methods or mechanisms may be used to firewall a new network device, such as new network device 608, from having access to the rest of the network. Different mechanisms exist for different types of communication protocols (e.g. Bluetooth®, Zigbee®, Ultra-Wideband (UWB), and/or the like). For example, different techniques for blocking the new network device may take place on several or all of the different layers within the Open Systems Interconnection (OSI) model within one or more of the different communication protocols. For example, filtering of the MAC address for the network device, as described herein, may take place within the Link layer (layer 2 of the model). In another example, intercommunication may be blocked, for example in IP within the networking layer, by disrupting the routing/communication route between the new network device and existing network devices. More specifically, the network may hide from the new network device the true location of the gateway, for example gateway 110. In another example, the new network device may be quarantined by adding it to a VLAN that is configured to disallow any connectivity to the other LANs within the network. In another example, communications (e.g. IP traffic) transmitted by the new network device may be blocked (i.e. held) by the gateway by preventing the communication from traveling through the network beyond the gateway.

Figure 9:
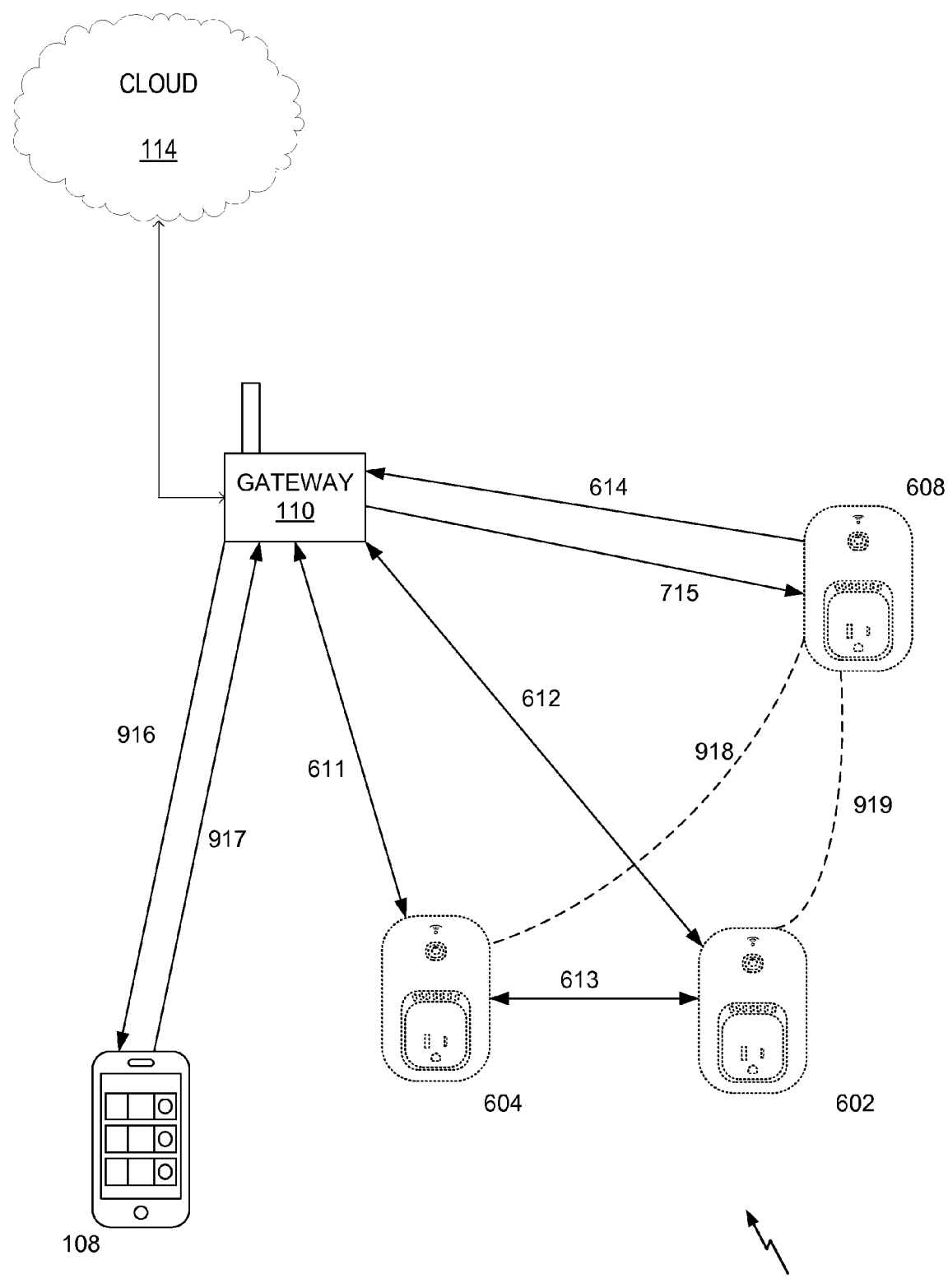
FIG. 9 illustrates an example of a local area network including a gateway and two network devices, according to embodiments of the present invention.

FIG. 9 illustrates an example of a local area network 900 including a gateway and two network devices, according to embodiments of the present invention. The local area network 900 may include a gateway 110, a network device 602, and a network device 604, similar to networks 600 and 700 described herein. Network device 608, as described with respect to FIGS. 7 and 8, may have connected to gateway 110 (e.g. via access point 811). However, as noted, new network device 608 may be prevented from communicating with portions or all of network 900, for example to network device 604 via potential communication path 918 and/or to network device 602 via communication path 919, before new network device 608 has been authenticated.

After gateway 110 (or guest entry point 611) has received a communication from new network device 608 (and either after or at the same time as gateway 110 establishes a connection with network device 608), gateway 110 may transmit/send a communication, via communication path 916, to access device 108. The communication may include a query including a request for confirmation whether new network device 608 should be allowed to join, or be authenticated to join, network 900. Access device 108, after receiving such a communication from gateway 110, may present the query to a user of the access device on a display of the access device. Examples of such displays are described further with respect to FIGS. 11-13. A user of the access device may respond to the query via the access device (e.g. by selecting an answer on the display). Access device 108, after receiving a response to the query from the user, may transmit/send a communication, via communication path 917, back to gateway 110 where the communication includes the user's answer to the query. If the user selected an option to allow/authenticate new network device 608 to join the network, gateway 110 may remove the firewall (or, for example, add the MAC address for new network device 608 to the gateway's ARP table) so as to allow new network device 608 to join the network and communicate with network devices on the network.

In an alternative embodiment, gateway 110 may, after receiving authorization from access device 108 for new network device 608 to join the network, transmit a new set of network credentials (e.g. SSID and password) to new network device 608. These new network credentials may be different than the first set of network credentials received by new network device 608, because the new network credentials may allow new network device 608 to fully connect to the network and communicate with each network device (e.g. network devices 602 and 604) on the network, whereas the first set of network credentials only allowed new network device 608 to join the guest network. In other words, after authorization, the gateway 110 may transmit a communication including the "true" or "real" credentials for full access to the network and all devices on the network (e.g. including network devices 602 and/or 604).

For example, in such a scenario, new network device 608 may be able to use communication paths 918 and 919 to communicate with network devices 604 and 602, respectively. If, on the other hand, the user selected an option to not allow/authenticate new network device 608 to join the network, gateway 110 may leave the firewall in place (or, for example, remove the MAC address for new network device 608 from the gateway's ARP table) so as to prevent new network device 608 from joining the network and communicating with network devices on the network. In response to such a response as received from the access device, gateway 110 may also (alternatively or in addition) terminate the connection between gateway 110 (or the access point) and the new network device.

Gateway 110 (or a user or access device controlling gateway 110) may choose to connect network device 608 to the network (and allow network device 608 to begin communicating with other network devices on the network 1000) without sending the network credentials to network device 608. For example, gateway 110 may, for a predetermined and limited amount of time, open the network to remove the password protection from network 1000 such that a new device (such as network device 608) would not require a password to connect to the network. In such an embodiment, network device 608 may connect to the network and after the predetermined amount of time the network would revert back to being password protected (and protected from new devices connecting to the network without permission). Alternatively, devices may be added to the network (e.g. via MAC address or other identifying information) on a device-by-device basis. For example, as described further herein, the MAC address of the new network device may be added to the ARP table of the gateway 110.

Other embodiments of the present invention include alternative ways for gateway 110 to communicate with a user to authenticate new network device 608. For example, gateway 110 may include a display itself on which it may present a query to a user. Any other way for gateway 110 to communicate with a user may also be included in possible embodiments of the present invention. Furthermore, gateway 110 may not be required to communicate with a user (or access device 108) to authenticate new network device 608. For example, gateway 110 may have a stored list of MAC addresses (or other identifying information) for potential new network devices, and gateway 110 may compare the MAC address of a new network device to the list of MAC addresses to determine whether a new network device should be allowed to join the network. For example, such a list may be a predetermined list of all of the potential new network devices that are allowed to join the network. Alternatively, such a list may be stored on cloud network 114. In such an embodiment, gateway 110 may send a communication to cloud 114 after a new network device has requested joining the network. Cloud 114 may then send a response to gateway 110 indicating whether the new network device should be allowed (authenticated) to join the network.

Figure 10:
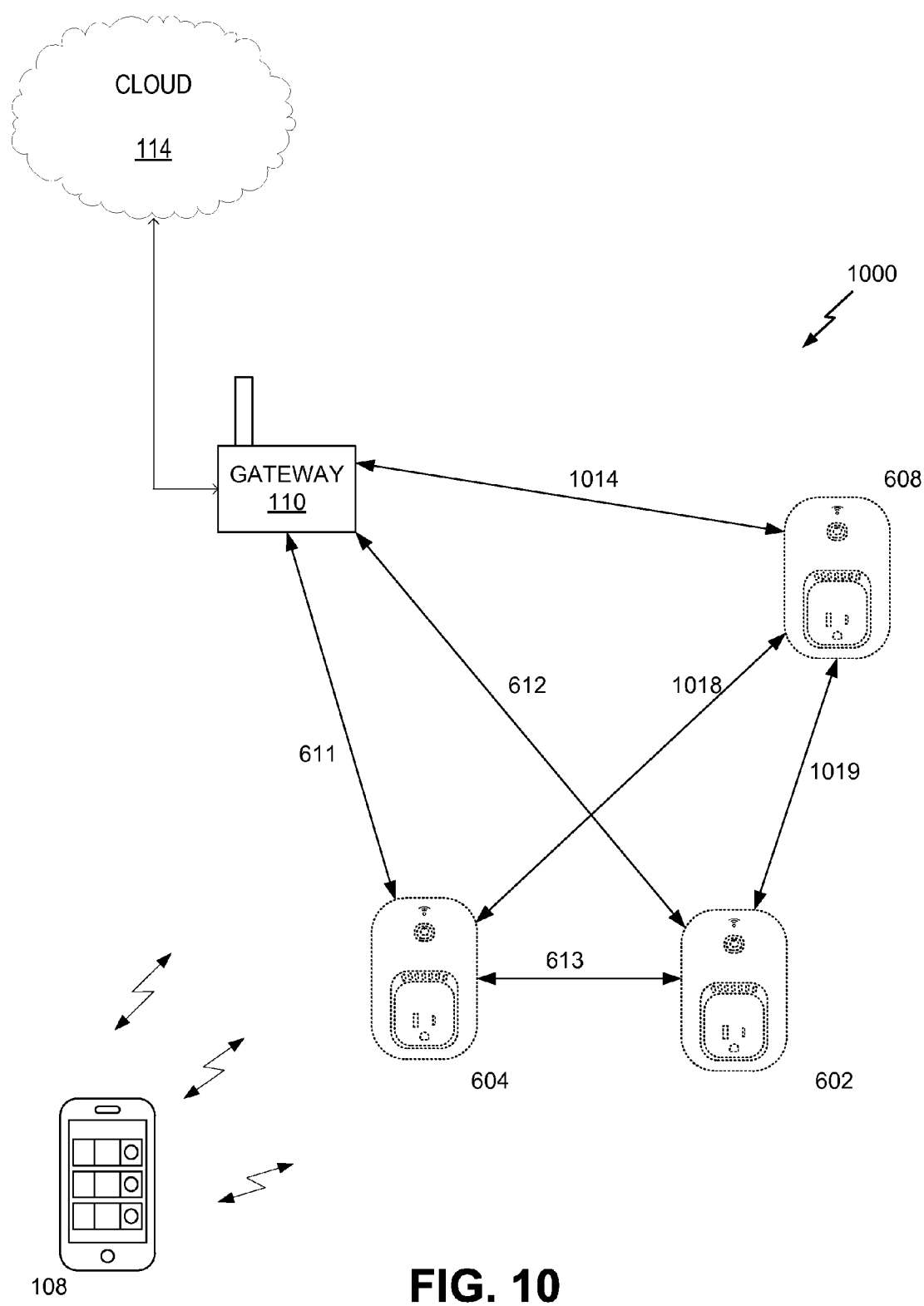
FIG. 10 illustrates an example of a local area network including a gateway and three network devices, according to embodiments of the present invention.

FIG. 10 illustrates an example of a local area network 1000 including a gateway and three network devices, according to embodiments of the present invention. The local area network 1000 may include a gateway 110, a network device 602, and a network device 604, and a network device 608. Unlike networks 600, 700, and 900, new network device 608 has joined network 1000 and has been authenticated so as to allow new network device 608 to communicate with network devices 602 and/or 604. For example, new network device 608 may communicate with network devices 602 and 604 via gateway 110 (using communication path 1014 and communication path 611 or 612). Alternatively, new network device 608 may know (e.g. have stored) MAC addresses and/or other identification information for network devices 602 and/or 604 so as to allow new network device 608 to communicate directly with the other network devices. For example, network device 608 may communicate with network device 602 via communication path 1019 and may communicate with network device 604 via communication path 1018. As noted herein, access device 108 may control one or more aspects of any device on network 1000, including gateway 110, network device 602, network device 604, and/or network device 608.

Although FIGS. 6-10 have been described with respect to network devices (e.g. network devices 602, 604 and 608), embodiments of the present invention may be implemented within a mesh network. For example, each network device as described in FIGS. 6-10 may be replaced by a node in a mesh network, and such nodes in the network may implement the actions/methods described herein with respect to the described network devices. Network devices, for example network devices 602, 604 and/or 608, may also be connected to nodes in such a mesh network.

Figure 11:
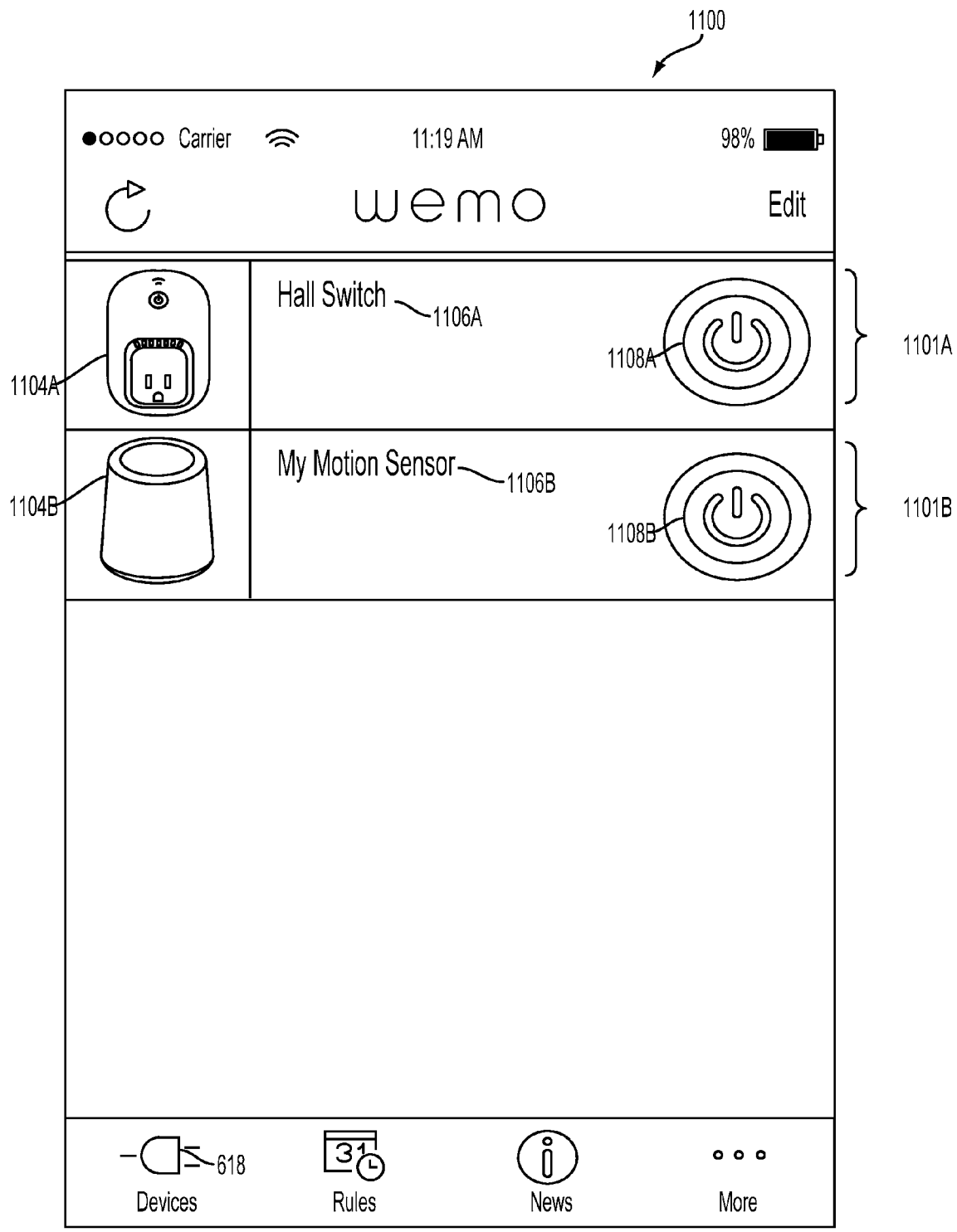
FIG. 11 illustrates an exemplary user interface display for an application on an access device, according to embodiments of the present invention.
Figure 12:
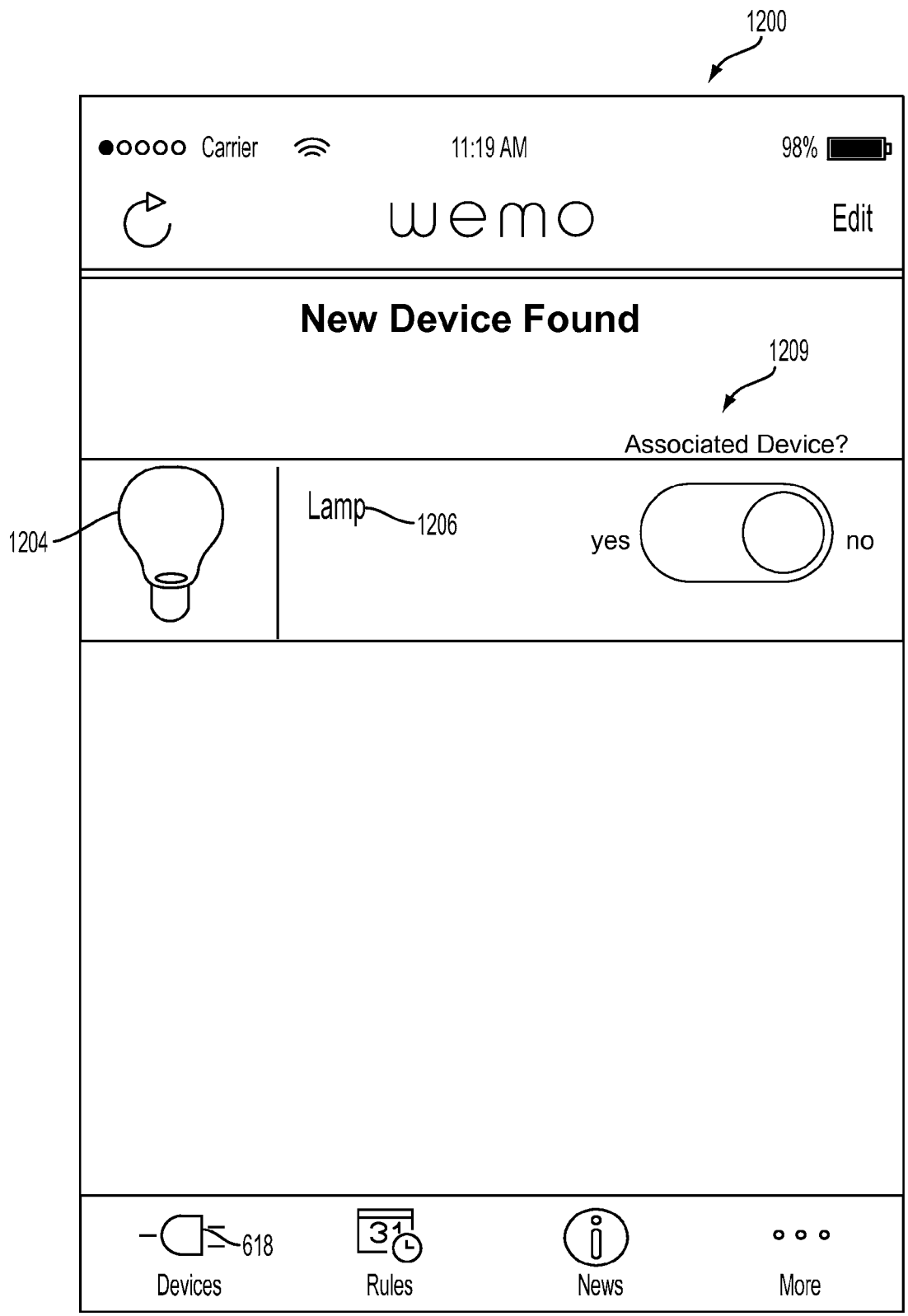
FIG. 12 illustrates an exemplary user interface display for an application on an access device, according to embodiments of the present invention.
Figure 13:
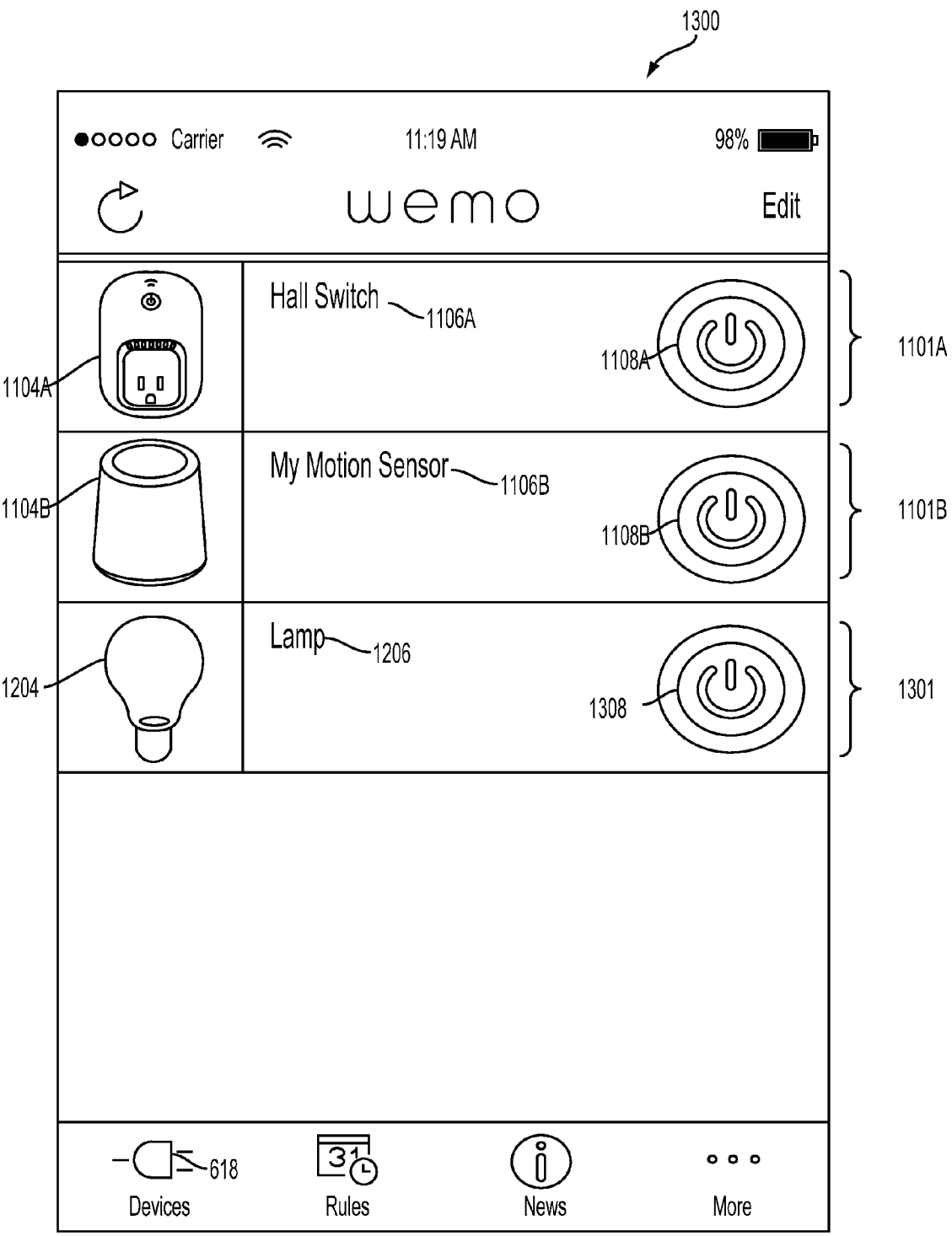
FIG. 13 illustrates an exemplary user interface display for an application on an access device, according to embodiments of the present invention.

FIGS. 11-13 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 11-13 are displayed on a mobile computing device, which can have a touch sensitive (i.e., touch screen) display device. For ease of explanation, the monitoring and control operations discussed below with reference to FIGS. 11-13 are described in the context of an application executing on an access device 108 with a touch-screen display device. However, the operations are not intended to be limited to the exemplary device shown in FIGS. 11-13. It is to be understood that the user interfaces illustrated in the exemplary embodiments of FIGS. 8-10 can be readily adapted to be rendered on displays of a variety of computing device platforms running a variety of operating systems. Throughout FIGS. 11-13, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 11 illustrates an exemplary user interface display 1100 for an application on an access device, according to embodiments of the present invention. FIG. 11 discloses a list of two exemplary network devices, including devices 1104A and 1104B, which have displays 1101A and 1101B assigned to devices 1104A and 1104B, respectively. Device 1104A is connected to a hall switch 1106A and device 1104B is connected to a motion sensor 1106B. Device 1104A (or the hall switch 1106A) can be turned on by a user by pressing button 1108A and device 1104B (or motion sensor 1106B) can be turned on by a user by pressing button 1108B.

FIG. 12 illustrates another exemplary user interface display 1200 for an application on an access device, according to embodiments of the present invention. As noted with respect to FIG. 3, network device, for example gateway 110, may communicate with access device 108 to confirm whether a network device should be allowed to join the local area network such that a new network device, for example new network device 608 as shown in FIGS. 6-9, is associated with the local area network. As such, access device 108 may present/display a query 1209 ("Associated Device?") to a user of access device 108 requesting an input regarding whether the user wants the new network device to be connected to the local area network. The user may use the query switch to select "yes" or "no" to the query to indicate to the access device whether the newly recognized device should be associated with the local area network such that the device should be allowed to join the network. After the user inputs an answer to the query into the UI display of the access device, access device 108 may transmit a communication to, for example gateway 110, indicating that the new network device is or is not intended (e.g. by the user) to be connected to the local area network. Thereafter, as noted with respect to FIGS. 9-10, after gateway 110 receives a communication from access device 108 that the new network device is associated with the local area network, gateway 110 may pair with network device 608 and continue the process of joining the new network device with the local area network.

FIG. 13 illustrates another exemplary user interface display 1300 for an application on an access device, according to embodiments of the present invention. FIG. 13 discloses a list of exemplary network devices, including devices 1104A and 1104B, which have associated displays 1101A and 1101B respectively, as shown in FIG. 11. FIG. 13 also discloses a display 1301 associated with the new network device, network device 1204 that is connected to lamp 1206. New network device 1204 may be replaced by, for example, new network device 608 as described in FIGS. 6-10, in certain embodiments. Display 1301 may appear on UI display 1300 after network device 1204 has joined the local area network (and therefore after a user enters an input to indicate to the access device that the newly recognized device is be associated with the local area network such that the device should be allowed to join the network). Similar to power button 1108A for device 1104A and power button 1108B for device 1104B, the display 1301 for new network device 1204 includes power button 1308 for turning lamp 1206 on and off.

Figure 14:
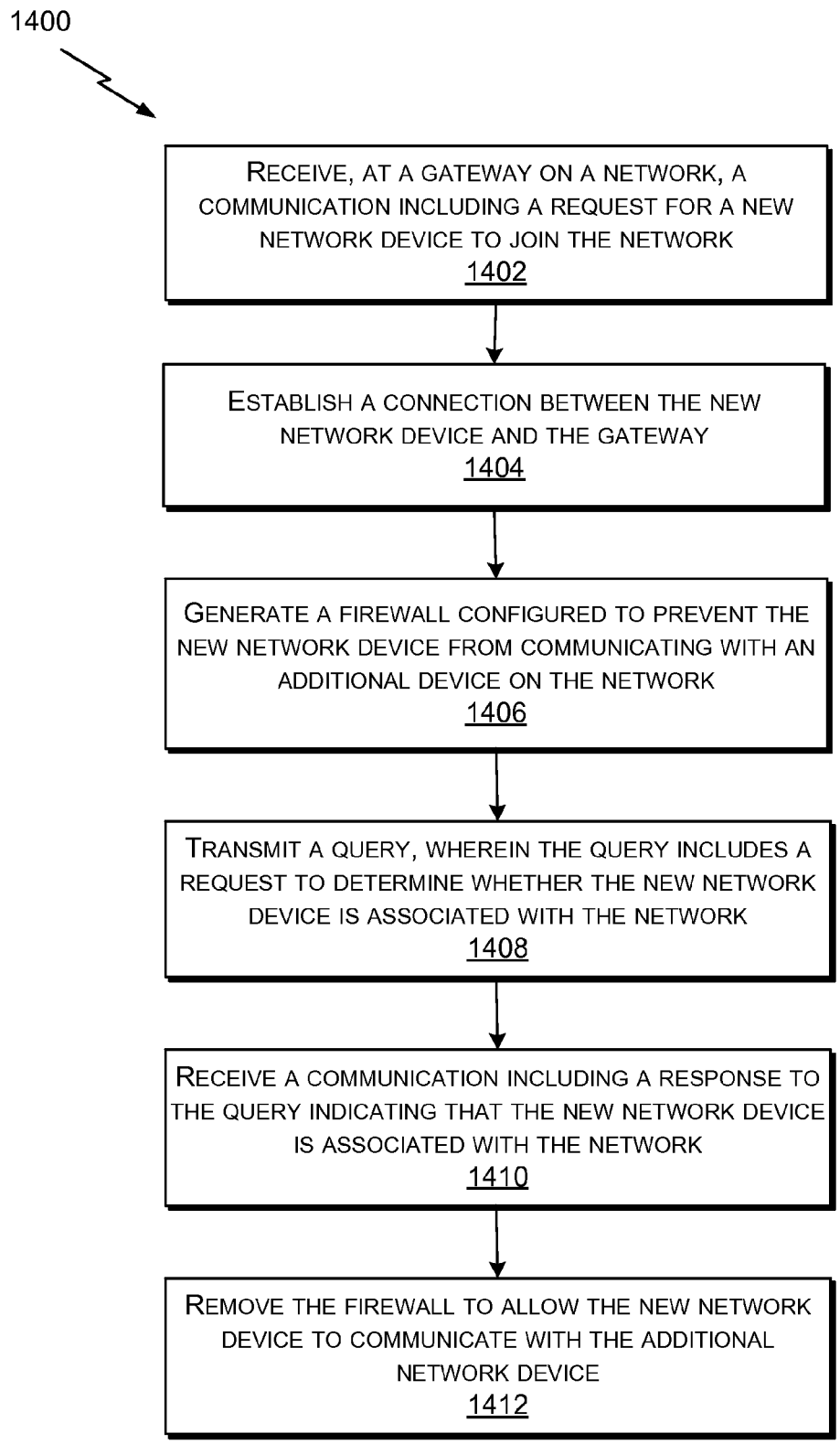
FIG. 14 is a flow chart showing an exemplary process for a new network device attempting to connect to a network, according to embodiments of the present invention.

FIG. 14 is a flow chart 1400 showing an exemplary process for a network to confirm authentication of a new network device attempting to connect to the network, according to embodiments of the present invention. Step 1402 includes receiving, at a gateway on a network, a communication including a request for a new network device to join the network. For example, a gateway, such as gateway 110, may receive a communication from a new network device indicating that the new network device is attempting to join the network. More specifically, the communication may include a request to connect with a guest access point of the gateway and/or may contain information related to the new network device.

Step 1404 includes establishing a connection between the new network device and the gateway. For example, gateway 110 may directly connect with the new network device, or a guest entry/access point either connected to or a part of gateway 110 may connect to the new network device. The guest access point may allow the new network device to connect to the network, but may prevent the new network device from connecting with or communicating with any network device on the network. As such, step 1406 includes generating a firewall configured to prevent the new network device from communicating with an additional device on the network. The firewall may be generated by removing the MAC address of the new network device from an ARP table stored at gateway 110 (or, alternatively, never updating the ARP table with the MAC address of the new network device in the first place after the new network device connects to the guest entry point).

Step 1408 includes transmitting a query, wherein the query includes a request to determine whether the new network device is associated with the network. After the gateway receives a request from the new network device to join the network, the gateway may send a communication including a request to determine whether the new network device should be allowed to join the network (i.e. whether the new network device should be authenticated). For example, the query may be sent to an access device (e.g. mobile device) for a user of the access device to respond to the query. In alternative embodiments, the gateway may perform other methods of authenticating the new network device before allowing the network device to communicate with other devices, or certain predetermined/chosen network devices, on the network.

Step 1410 includes receiving a communication including a response to the query indicating that the new network device is associated with the network. The access device may send a response to the query, to determine if the new network device should be allowed to join the network, to the gateway, based on an input from a user of an access device or otherwise. Such a response allows the gateway to determine whether to allow the network device to fully connect to the network and devices on the network or whether to terminate the connection between the new network device and the gateway. As such, step 1412 includes removing the firewall so as to allow the new network device to communicate with the additional network device.

Figure 15:
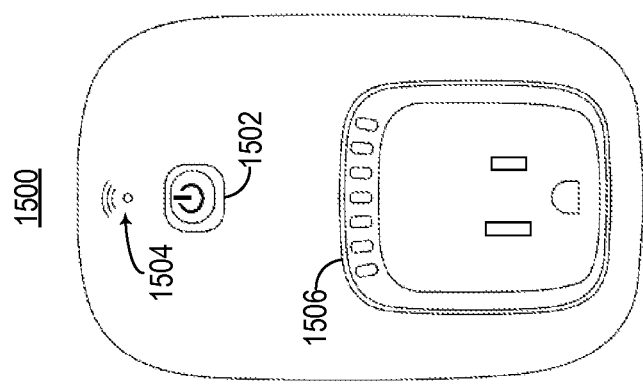
FIG. 15 illustrates an example of a front view of a network device, according to embodiments of the present invention.
Figure 16:
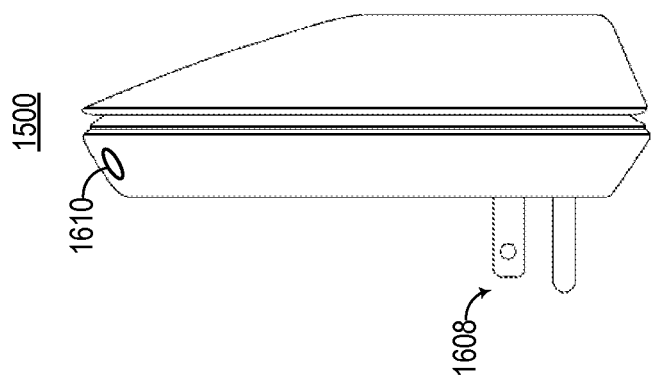
FIG. 16 illustrates an example of a side view of a network device, according to embodiments of the present invention.

FIG. 15 illustrates an example of a front view of a network device 1500. FIG. 16 illustrates an example of a side view of the network device 1500. The network device 1500 may include any of the network devices 102, 104, or 106 described herein. In some embodiments, the network device 1500 may be a home automation network device. For example, the network device 1500 may include a home automation switch that may be coupled with a home appliance. A user may wirelessly access the network device 1500 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1500 may include a WiFi enabled switch that connects home appliances and other electronic devices to a compatible 802.11b/g/n/ac WiFi network. The network device 1500 may thus allow users to locally or remotely turn devices on or off from anywhere, program customized notifications, and/or change device status. The network device 1500 may further allow a user to create custom schedules or have devices respond to sunrise or sunset.

The network device 1500 includes an power switch 1502 that may be depressed in order to turn the network device 1500 on and off. In some embodiments, a light source may be integrated with or located behind the power switch. For example, a light-emitting diode (LED) may be located on a circuit board under the power button 1502. The light source may be illuminated when the network device 1500 is powered on, and may not be illuminated when the network device 1500 is powered off.

The network device 1500 further includes a communications signal indicator 1504. The signal indicator 1504 may indicate whether the network device 1500 has access to a communications signal, such as a WiFi signal. For example, the signal indicator 1504 may include a light source (e.g., a LED) that illuminates when the network device 1500 is connected to a communications signal. The light source may depict different colors or other characteristics (e.g., flashing, dimming, or the like) to indicate different levels of signal strength or mode of operation.

The network device 1500 includes a restore button 1610. The restore button 1610 may allow a user to reset the network device 1500 to factory default settings. For example, upon being depressed, the restore button 1610 may cause all software on the device to be reset to the settings that the network device 1500 included when purchased from the manufacturer.

The network device 1500 further includes a plug 1608 and an outlet 1506. The plug 1608 allows the network device 1500 to be plugged into a wall socket, such as a socket providing 120V, 220V, or the like. In turn, an appliance may be plugged into the outlet 1506. Once the network device 1500 is registered according to the techniques described above, an appliance plugged into the socket 1506 may be controlled by a user using an access device (e.g., access device 108).

Figure 17:
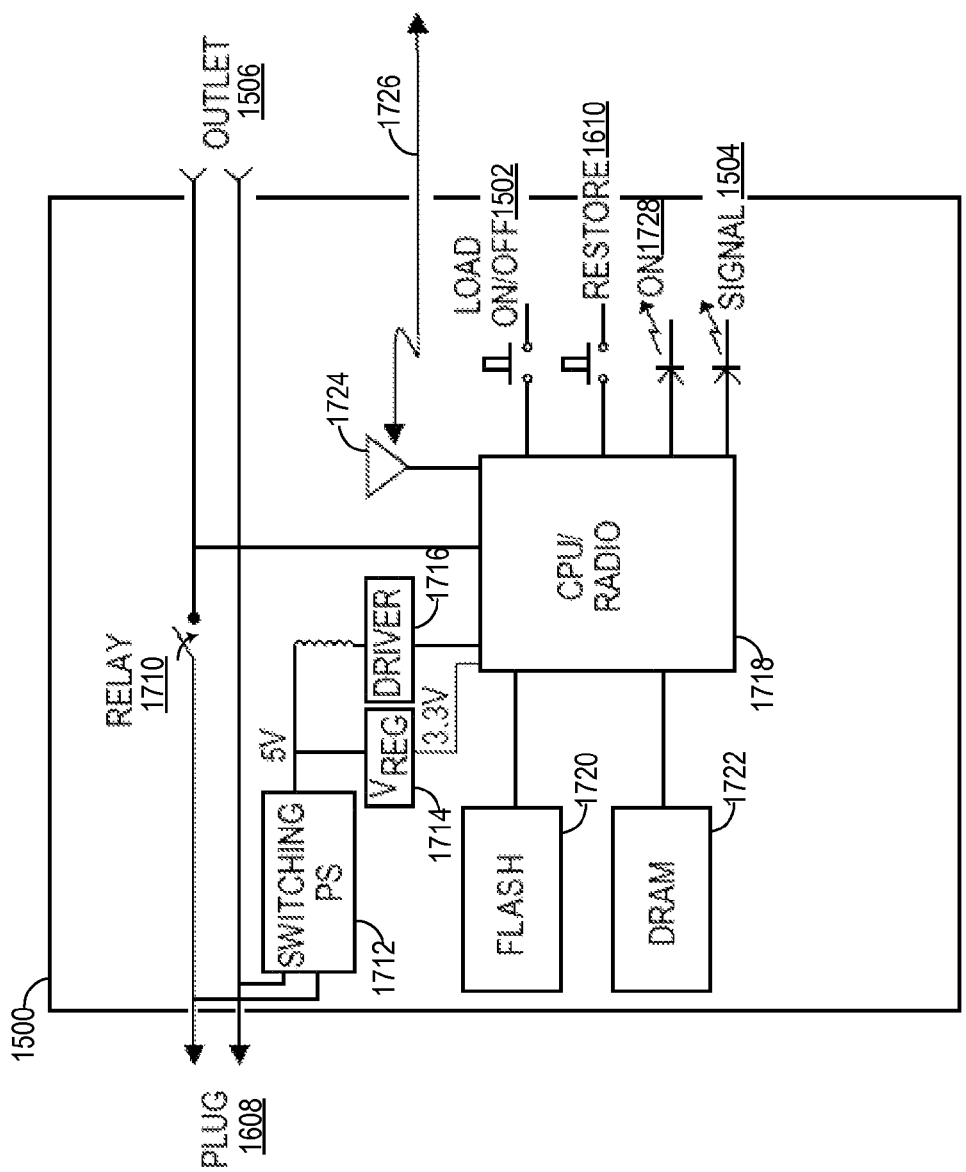
FIG. 17 illustrates an example of a block diagram of a network device, according to embodiments of the present invention.

FIG. 17 is an example of a block diagram of the network device 1500 depicting different hardware and/or software components of the network device 1500. As described above with respect to FIGS. 15 and 16, the network device 1500 includes the outlet 1506, the plug 1608, the power button 1502, the restore button 1610, and the communications signal indicator 1504. The network device 1500 also includes light source 1728 associated with the power button 1502. As previously described, the light source 1728 may be illuminated when the network device 1500 is powered on.

The network device 1500 further includes a relay 1710. The relay 1710 is a switch that controls whether power is relayed from the plug 1608 to the outlet 1506. The relay 1710 may be controlled either manually using the power button 1502 or remotely using wireless communication signals. For example, when the power button 1502 is in an ON position, the relay 1710 may be closed so that power is relayed from the plug 1608 to the outlet 1506. When the power button 1502 is in an OFF position, the relay 1710 may be opened so that current is unable to flow from the plug 1608 to the outlet 1506. As another example, an application or program running on an access device may transmit a signal that causes the relay 1710 to be opened or closed. For instance, an access application may display a graphical interface on the access device that includes a power button. The user may tap or otherwise select the power button, and the access application may send a communication signal (e.g., over a WiFi network) to the network device 1500 instructing the network device 1500 to open or close the relay 1710.

The network device 1500 further includes flash memory 1720 and dynamic random access memory (DRAM) 1722. The flash memory 1720 may be used to store instructions or code relating to an operating system, one or more applications, and any firmware. The flash memory 1720 may include nonvolatile memory so that any firmware or other program can be can updated. In the event the network device 1500 loses power, information stored in the flash memory 1720 may be retained. The DRAM 1722 may store various other types of information needed to run the network device 1500, such as all runtime instructions or code.

The network device 1500 further includes a CPU/Radio 1718. The CPU/Radio 1718 controls the operations of the network device 1500. For example, the CPU/Radio 1718 may execute various applications or programs stored in the flash memory 1720 and/or the dynamic random access memory (DRAM) 1722. The CPU/Radio 1718 may also receive input from the various hardware and software components, interpret the input, and perform one or more functions in response to the input. As one example, the CPU/Radio 1718 may determine whether the power button 1502 has been pressed, and determines whether the relay 1710 needs to be opened or closed. The CPU/Radio 1718 may further perform all communications functions in order to allow the network device 1500 to communicate with other network devices, one or more gateways, a cloud network, and/or one or more access devices. While the CPU and radio of the network device 1500 are shown to be combined in the CPU/Radio 1718, one of ordinary skill in the art will appreciate that, in some embodiments, the CPU and radio may be separately located within the network device 1500. For example, CPU circuitry may be situated at a separate location on a circuit board from the location of radio circuitry, the CPU circuitry may be located on a different circuit board from the radio circuitry, or the like.

The network device 1500 may communicate with other devices and/or networks via antenna 1724. For example, antenna 1724 may include a 2.4 GHz antenna, a 5 GHz antenna, or the like, that can transmit and receive WiFi communications signals. The antenna 1724 may include other types of antennas that can communicate Bluetooth® signals, Zigbee® signals, Ultra-Wideband (UWB) signals, and/or the like. In some embodiments, the network device 1500 may include multiple antennas for communicating different types of communication signals. As one example, the network device 1500 may include both a 2.4 GHz antenna and a 5 GHz antenna.

The network device 1500 further includes a driver 1716, a switching power supply 1712, and a voltage regulator 1714. The driver 1716 may include instructions or code that can be used to translate control signals or commands received from applications running on the DRAM 1722 to commands that the various hardware components in the network device 1500 can understand. In some embodiments, the driver 1716 may include an ambient application running on the DRAM 1722. The switching power supply 1712 may be used to transfer power from the outlet in which the plug 1608 is connected to the various loads of the network device 1500 (e.g., CPU/Radio 1718). The switching power supply 1712 may efficiently convert the voltage and current characteristics of the electrical power to a level that is appropriate for the components of the network device 1500. For example, the switching power supply 1712 may perform AC-DC conversion. In some embodiments, the switching power supply 1712 may be used to control the power that is relayed from the plug 1608 to the outlet 1506. The voltage regulator 1714 may be used to convert the voltage output from the switching power supply 1712 to a lower voltage usable by the CPU/Radio 1718. For example, the voltage regulator 1714 may regulate the DC voltage from 5V to 3.3V.

In various embodiments, functions may be stored as one or more computer-program products, such as instructions or code, in a non-transitory machine-readable storage medium, such as the flash memory 1720 and/or the DRAM 1722. The network device 1500 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1720 and/or the DRAM 1722, may be a processor-readable memory and/or a computer-readable memory that stores software code (programming code, instructions, etc.) configured to cause a processor(s) within the CPU/Radio 1718 to perform the functions described. In other embodiments, one or more of the functions described may be performed in hardware.

A set of these instructions and/or code might be stored on a non-transitory machine-readable storage medium, such as the flash memory 1720 and/or the DRAM 1722. In some cases, the storage medium might be incorporated within a computer system, such as the CPU/Radio 1718. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1500 and/or might take the form of source and/or installable code, which, upon compilation and/or installation on the network device 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1500 may have other components than those depicted in FIGS. 15-17. Further, the embodiment shown in the figures are only one example of a network device that may incorporate an embodiment of the invention. In some other embodiments, network device 1500 may have more or fewer components than shown in the figure, may combine two or more components, or may have a different configuration or arrangement of components.

Figure 18:
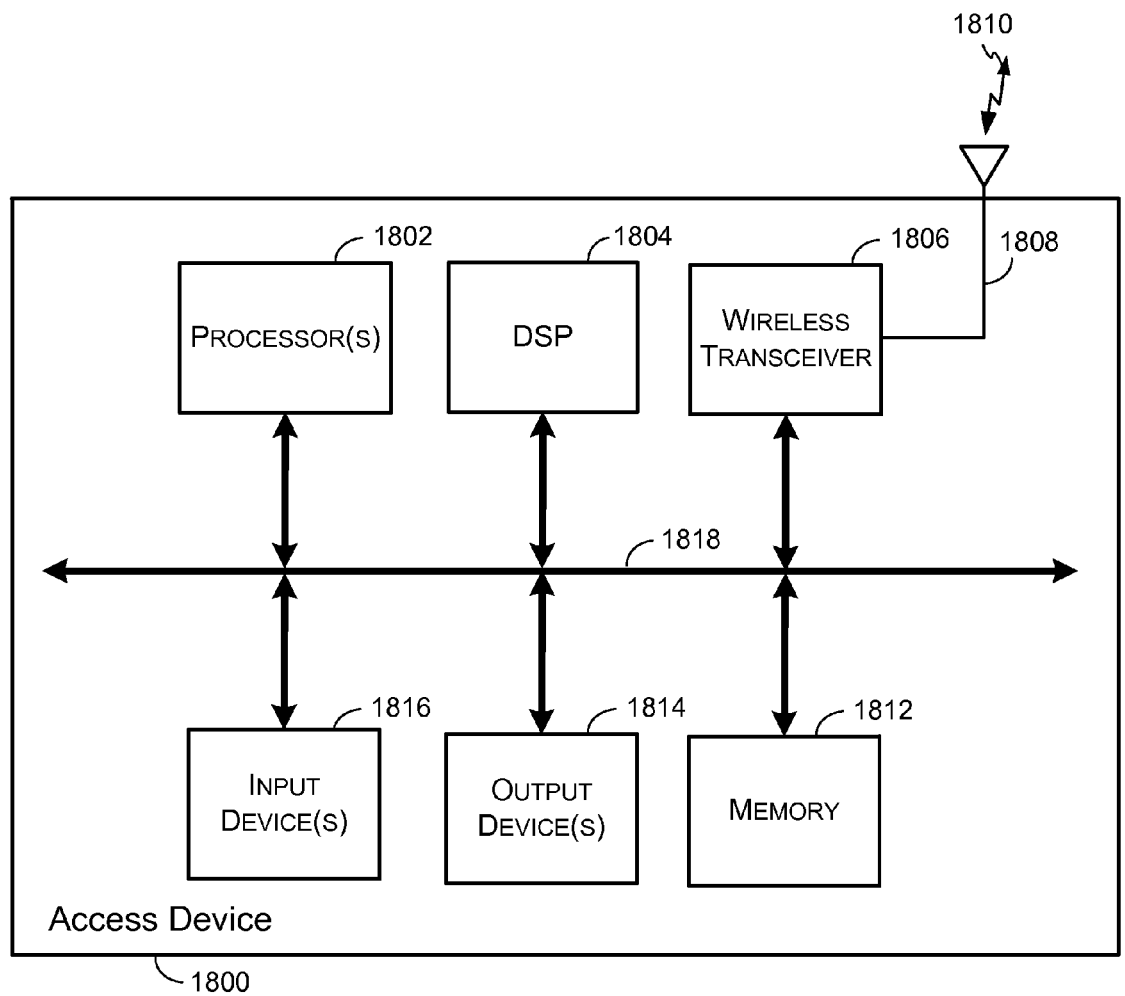
FIG. 18 illustrates a block diagram illustrating an example of an access device, according to embodiments of the present invention.

FIG. 18 illustrates an example of an access device 1800. The access device 1800 may include any human-to-machine interface with network connection capability that allows access to a network. For example, the access device 1800 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1800 includes hardware elements that can be electrically coupled via a bus 1818 (or may otherwise be in communication, as appropriate). In one embodiment, the bus 1818 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like); one or more input devices 1816, which can include without limitation a camera, a mouse, a keyboard, a touch sensitive screen, a touch pad, a keypad, and/or the like; and one or more output devices 1814, which can include, without limitation, a display, a printer, and/or the like.

The access device 1800 may include one or more wireless transceivers 1806 connected to the bus 1818. The wireless transceiver 1806 may be operable to receive wireless signals (e.g., signal 1810) via antenna 1808. The wireless signal 1810 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1806 may be configured to receive various radio frequency (RF) signals (e.g., signal 1810) via antenna 1808 from one or more gateways, network devices, other access devices, cloud networks, and/or the like. Access device 1800 may also be configured to decode and/or decrypt, via the DSP 1804 and/or processor(s) 1802, various signals received from one or more gateways, network devices, other access devices, cloud networks, and/or the like.

The access device 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1812, such as RAM, ROM, FLASH, or disc drive, and executed by processor(s) 1802 or DSP 1804. The access device 1800 can also comprise software elements (e.g., located within the memory 1812), including, for example, an operating system, device drivers, executable libraries, and/or other code, such as one or more application programs, which may comprise computer programs implementing various functions. Memory 1812 may be a non-transitory machine-readable storage medium, processor-readable memory, and/or a computer-readable memory that stores the one or more computer-program products configured to cause the processor(s) 1802 and/or DSP 1804 to perform the various functions. In other embodiments, the various functions described may be performed in hardware.

Figure 19:
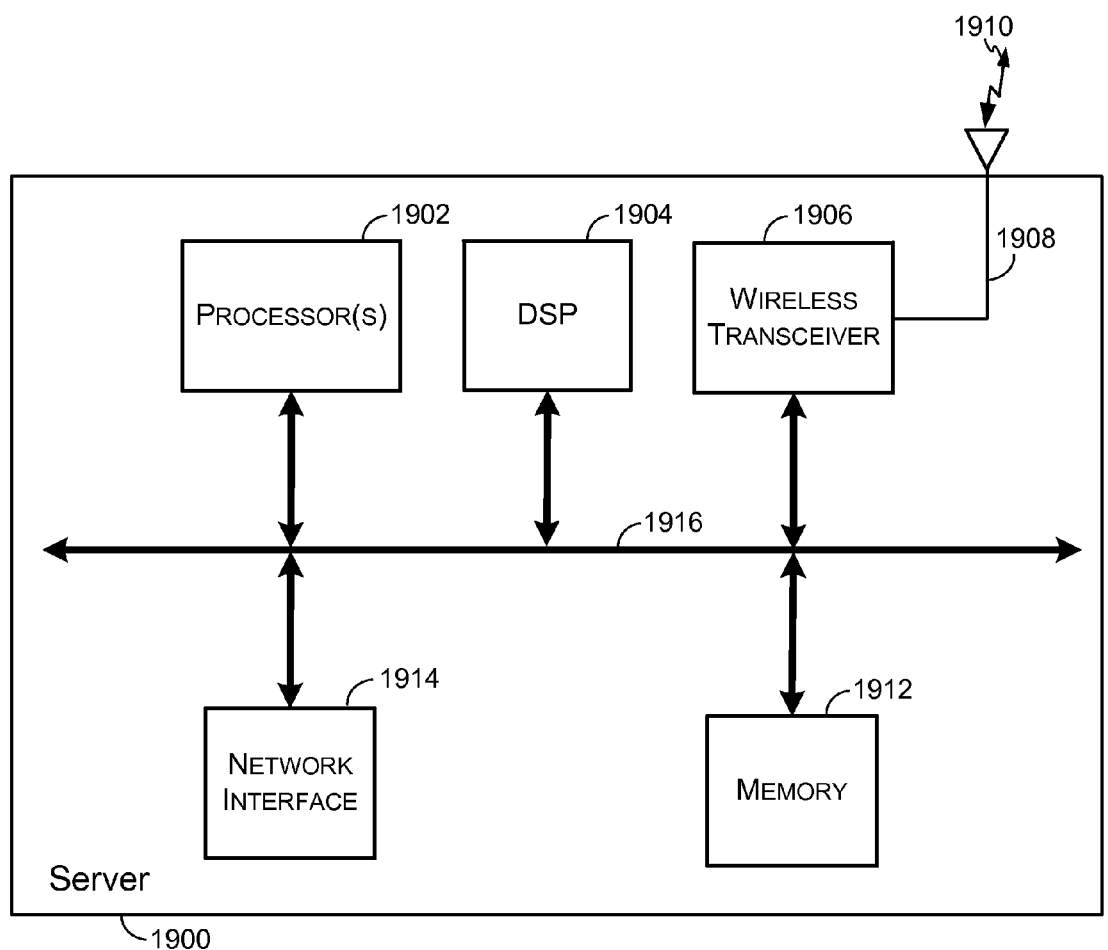
FIG. 19 illustrates a block diagram illustrating an example of a server, in accordance with some embodiments.

FIG. 19 illustrates an example of a server 1900. The server 1900 includes hardware elements that can be electrically coupled via a bus 1916 (or may otherwise be in communication, as appropriate). In one embodiment, the bus 1916 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like), memory 1912, DSP 1904, a wireless transceiver 1906, a bus 1916, and antenna 1908. Furthermore, in addition to the wireless transceiver 1906, server 1900 can further include a network interface 1914 to communicate with a network (e.g., a local area network, a network of a preferred carrier, Internet, etc.).

The server 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1912. The server 1900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1912 may be a non-transitory machine-readable storage medium, processor-readable memory, and/or a computer-readable memory that stores the one or more computer-program products configured to cause the processor(s) 1902 to perform the functions described. In other embodiments, one or more of the functions described may be performed in hardware.

A set of these instructions and/or code might be stored on a non-transitory machine-readable storage medium, such as the memory 1912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1900 and/or might take the form of source and/or installable code, which, upon compilation and/or installation on the server 1900 (e.g., using any of a variety of generally available compilers, installation programs, compression/decompression utilities, etc.) then takes the form of executable code.

Figure 20:
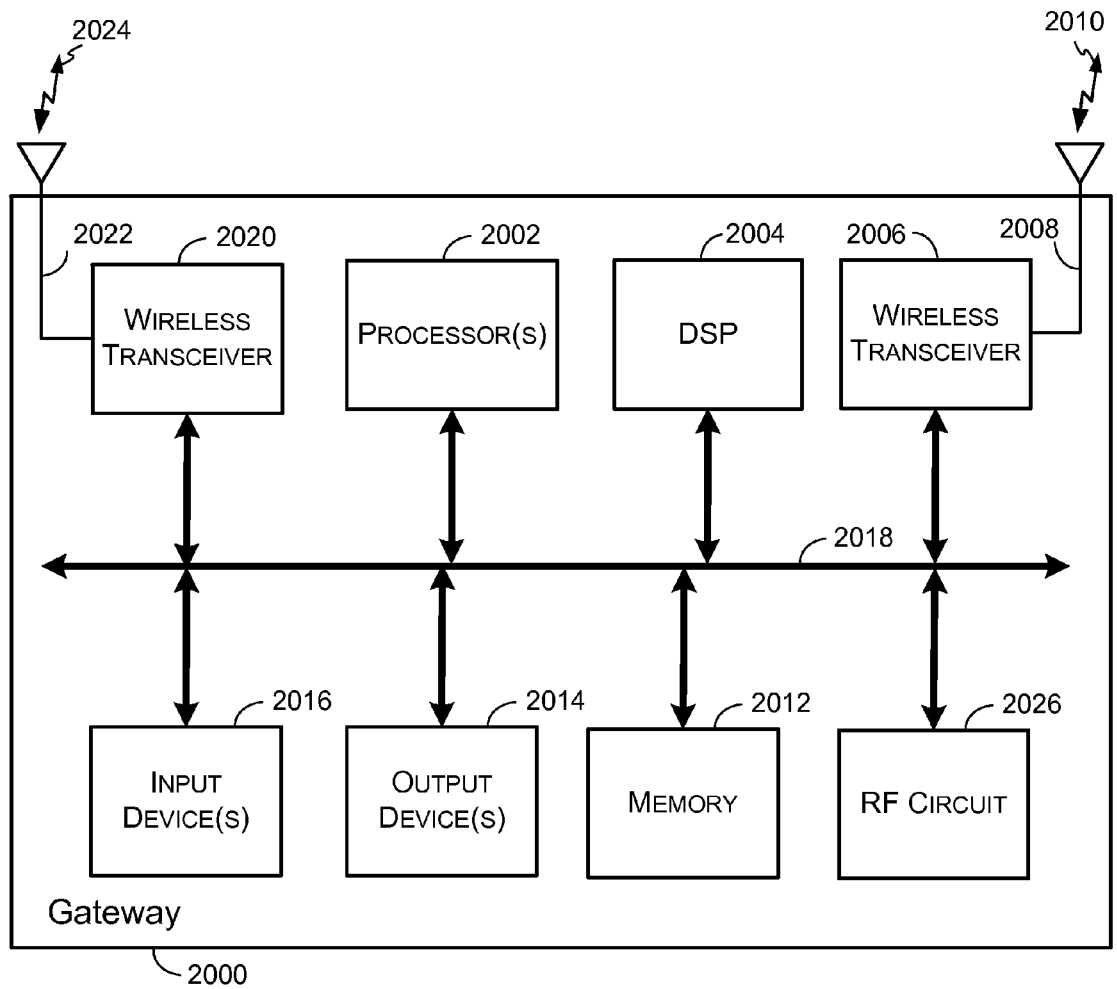
FIG. 20 illustrates a block diagram illustrating an example of a gateway, in accordance with some embodiments.

FIG. 20 illustrates an example of a gateway 2000. The gateway 2000 may include a range extending device, a router, an access point, a modem, and/or any other device that provides network access among one or more computing devices and/or external networks. For example, the gateway 2000 may include a router gateway with access point and router functionality, and may further include an Ethernet switch and/or a modem. As another example, the gateway 2000 may include a range extending gateway that may be used to improve signal range and strength within a network by taking an existing signal from another gateway (e.g., a router gateway, an access point, or the like) and rebroadcasting the signal to create a second logical network.

The gateway 2000 includes hardware elements that can be electrically coupled via a bus 2018 (or may otherwise be in communication, as appropriate). In one embodiment, the bus 2018 can be used for the processor(s) 2002 to communicate between cores and/or with the memory 2012. The hardware elements may include one or more processors 2002, including without limitation one or more general-purpose processors and/or one or more special-purpose processors (such as digital signal processing chips, graphics acceleration processors, and/or the like); one or more input devices 2016, which can include without limitation one or more buttons, a keyboard, a keypad, a touch sensitive screen, a touch pad, and/or the like; and one or more output devices 2014, which can include, without limitation, a display, light or sound indicators, and/or the like.

The gateway 2000 may include one or more wireless transceivers 2006 and 2020 connected to the bus 2018. The wireless transceiver 2006 may be operable to receive wireless signals (e.g., a wireless signal 2010) via an antenna 2008. The wireless transceivers 2020 may be operable to receive wireless signals (e.g., a wireless signal 2014) via an antenna 2022. The wireless transceivers 2006 and 2020 may each include a WiFi transceiver radio designed to transmit and receive signals using frequencies of a specific frequency band, which may be referred to herein as "WiFi circuits." For example, wireless transceiver 2006 may include a 2.4 GHz WiFi circuit, and wireless transceiver 2020 may include a 5 GHz WiFi circuit. Accordingly, the gateway 2000 may include a single WiFi circuit for a first WiFi frequency band, and a single WiFi circuit for a second WiFi frequency band. In some embodiments, the gateway 2000 may include multiple wireless transceivers (not shown) for each available frequency band. The antennas 2008 and 2022 may include multiple band antennas that can transmit and/or receive signals over different frequency bands.

The gateway 2000 may further include radio frequency (RF) circuit 2026. In some embodiments, the wireless transceivers 2006 and 2020 may be integrated with or coupled to the RF circuit 2026 so that the RF circuit 2026 includes the wireless transceivers 2006 and 2020. In some embodiments, the wireless transceivers 2006 and 2020 and the RF circuit 2026 are separate components. The RF circuit 2026 may include a RF amplifier that may amplify signals received over antennas 2008 and 2022. The RF circuit 2026 may also include a power controller that may be used to adjust signal amplification by the RF amplifier. The power controller may be implemented using hardware, firmware, software, or any combination thereof.

The wireless signals 2010 and 2024 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 2006 and 2020 may be configured to receive various radio frequency (RF) signals (e.g., signals 2010 and 2024) via antennas 2008 and 2024, respectively, from one or more other gateways, access devices, network devices, cloud networks, and/or the like. Gateway 2000 may also be configured to decode and/or decrypt, via the DSP 2004 and/or processor(s) 2002, various signals received from one or more gateways, network devices, cloud networks, and/or the like.

The gateway 2000 may include a power supply (not shown) that can power the various components of the gateway 2000. The power supply may include a switch-mode power supply, a linear power supply, a push-pull power supply, or any other suitable type of power supply. In some embodiments, the gateway 2000 may include multiple power supplies. For example, a switch-mode power supply may be used to condition input power, and a linear power supply may be used to power the RF circuit 2026. The power supply may be configured to operate over various ranges of appropriate input voltages.

The gateway 2000 may further include (and/or be in communication with) one or more non-transitory machine-readable storage mediums or storage devices (e.g., memory 2012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2012, such as RAM, ROM, FLASH, or disc drive, and executed by processor(s) 2002 or DSP 2004. The gateway 2000 can also comprise software elements (e.g., located within the memory 2012), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 14. The memory 2012 may be a non-transitory machine-readable storage medium, processor-readable memory, and/or a computer-readable memory that stores the one or more computer-program products configured to cause the processor(s) 2002 to perform the functions described. In other embodiments, one or more of the functions described may be performed in hardware.

A set of these instructions and/or code might be stored on a non-transitory machine-readable storage medium, such as the memory 2012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2000 and/or might take the form of source and/or installable code, which, upon compilation and/or installation on the gateway 2000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a gateway on a network, a communication including a request for a new network device to join the network;
   establishing a connection between the new network device and the gateway, wherein establishing the connection between the new network device and the gateway includes allowing the new network device to connect to a guest entry point of the network;
       generating a firewall configured to prevent the new network device from communicating with an existing device on the network, wherein establishing a connection between the new network device and the gateway and generating a firewall configured to prevent the new network device from communicating with an additional device on the network occur at substantially the same time;
   transmitting a query, wherein the query includes a request to determine whether the new network device is associated with the network;
   receiving a communication including a response to the query indicating that the new network device is associated with the network; and
   removing the firewall to allow the new network device to communicate with the existing network device.

2. The method of claim 1, further comprising: storing a data table including media access control (MAC) addresses associated with network devices on the network, wherein the new network device is associated with a MAC address on the data table.

3. The method of claim 2, wherein the data table is an address resolution protocol (ARP) table.

4. The method of claim 2, wherein generating the firewall includes removing the MAC address of the new network device from the data table.

5. The method of claim 2, wherein removing the firewall includes adding the MAC address of the new network device to the data table.

6. The method of claim 1, wherein the query is transmitted in response to establishing the connection between the new network device and the gateway.

7. The method of claim 1, wherein after the query is received, the query is presented on a display so as to allow a response to be entered at the display.

8. The method of claim 1, further comprising: transmitting a communication, including network credentials, to the new network device so as to allow the new network device to connect to the network.

9. A computing device, comprising:
   one or more processors; and
   a memory having instructions stored thereon, which when executed by the one or more processors, cause the computing device to perform operations including:
   receiving, at a gateway on a network, a communication including a request for a new network device to join the network;
   establishing a connection between the new network device and the gateway, wherein establishing the connection between the new network device and the gateway includes allowing the new network device to connect to a guest entry point of the network;
       generating a firewall configured to prevent the new network device from communicating with an existing device on the network, wherein establishing a connection between the new network device and the gateway and generating a firewall configured to prevent the new network device from communicating with an additional device on the network occur at substantially the same time;
   transmitting a query, wherein the query includes a request to determine whether the new network device is associated with the network;
   receiving a communication including a response to the query indicating that the new network device is associated with the network; and
   removing the firewall to allow the new network device to communicate with the existing network device.

10. The computing device of claim 9, further comprising instructions, which when executed by the one or more processors, cause the computing device to perform operations including: storing a data table including media access control (MAC) addresses associated with network devices on the network, wherein the new network device is associated with a MAC address on the data table.

11. The computing device of claim 10, wherein the data table is an address resolution protocol (ARP) table.

12. The computing device of claim 10, wherein generating the firewall includes removing the MAC address of the new network device from the ARP table.

13. The computing device of claim 10, wherein removing the firewall includes adding the MAC address of the new network device to the ARP table.

14. The computing device of claim 9, wherein the query is transmitted in response to establishing the connection between the new network device and the gateway.

15. The computing device of claim 9, wherein after the query is received, the query is presented on a display so as to allow a response to be entered at the display.

16. A computer-program product tangibly embodied in a non-transitory machine-readable storage medium, including instructions configured to cause a data processing apparatus to:
   receive, at a gateway on a network, a communication including a request for a new network device to join the network;
   establish a connection between the new network device and the gateway, wherein establishing the connection between the new network device and the gateway includes allowing the new network device to connect to a guest entry point of the network;
       generate a firewall configured to prevent the new network device from communicating with an existing device on the network, wherein establishing a connection between the new network device and the gateway and generating a firewall configured to prevent the new network device from communicating with an additional device on the network occur at substantially the same time;
   transmit a query, wherein the query includes a request to determine whether the new network device is associated with the network;
   receive a communication including a response to the query indicating that the new network device is associated with the network; and
   remove the firewall to allow the new network device to communicate with the existing network device.

17. The computing device of claim 9, further comprising instructions, which when executed by the one or more processors, cause the computing device to perform operations including: transmitting a communication, including network credentials, to the new network device so as to allow the new network device to connect to the network.

18. The computer-program product of claim 16, further comprising instructions configured to cause the data processing apparatus to: store a data table including media access control (MAC) addresses associated with network devices on the network, wherein the new network device is associated with a MAC address on the data table.

19. The computer-program product of claim 18, wherein the data table is an address resolution protocol (ARP) table.

20. The computer-program product of claim 18, wherein generating the firewall includes removing the MAC address of the new network device from the data table.

21. The computer-program product of claim 18, wherein removing the firewall includes adding the MAC address of the new network device to the data table.

22. The computer-program product of claim 16, wherein the query is transmitted in response to establishing the connection between the new network device and the gateway.

23. The computer-program product of claim 16, wherein after the query is received, the query is presented on a display so as to allow a response to be entered at the display.

24. The computer-program product of claim 16, further comprising instructions configured to cause the data processing apparatus to: transmit a communication, including network credentials, to the new network device so as to allow the new network device to connect to the network.

* * * * *